(12) United States Patent
Miyashita et al.

(10) Patent No.: US 8,368,392 B2
(45) Date of Patent: Feb. 5, 2013

(54) MAGNETIC ENCODER AND METHOD OF DETECTING ABSOLUTE ROTATIONAL POSITION

(75) Inventors: Kunio Miyashita, Azumino (JP); Muneo Mitamura, Azumino (JP); Junji Koyama, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 427 days.

(21) Appl. No.: 12/596,009

(22) PCT Filed: Apr. 24, 2007
(Under 37 CFR 1.47)

(86) PCT No.: PCT/JP2007/000449
§ 371 (c)(1),
(2), (4) Date: Oct. 15, 2009

(87) PCT Pub. No.: WO2008/136054
PCT Pub. Date: Nov. 13, 2008

(65) Prior Publication Data
US 2011/0025312 A1 Feb. 3, 2011

(51) Int. Cl.
*G01B 7/30* (2006.01)
(52) U.S. Cl. .................. 324/207.25; 324/207.2
(58) Field of Classification Search .......... 324/173–174, 324/207.2–207.25
See application file for complete search history.

(56) References Cited

U.S. PATENT DOCUMENTS

| | | | | |
|---|---|---|---|---|
| 5,059,900 | A | * | 10/1991 | Phillips .................. 324/160 |
| 6,124,588 | A | | 9/2000 | Hagl et al. |
| 2007/0164733 | A1 | * | 7/2007 | Kabashima et al. ..... 324/207.25 |
| 2009/0115409 | A1 | * | 5/2009 | Arinaga et al. .......... 324/207.25 |

FOREIGN PATENT DOCUMENTS

| | | | |
|---|---|---|---|
| JP | 58-162813 | A | 9/1983 |
| JP | 6-10813 | A | 2/1994 |
| JP | 10-019602 | A | 1/1998 |
| JP | 11-514091 | A | 11/1999 |
| JP | 2000-092805 | A | 3/2000 |
| JP | 2001-050774 | A | 2/2001 |
| JP | 2005-315817 | A | 11/2005 |
| WO | WO 98/01724 | A1 | 1/1998 |

OTHER PUBLICATIONS

International Search Report of Application No. PCT/JP2007/000449 dated May 29, 2007.

* cited by examiner

*Primary Examiner* — Jay Patidar
(74) *Attorney, Agent, or Firm* — Buchanan Ingersoll & Rooney PC

(57) ABSTRACT

A magnetic encoder includes a multi-pole magnetic detecting unit having a multi-pole magnet. In the multi-pole magnetic detecting unit, first and second magnetic detecting elements that output sinusoidal signals having a 90° phase difference are arranged apart from third and fourth magnetic detecting elements at a mechanical angle of 180°. The first and third magnetic detecting elements are disposed at the same position represented by an electrical angle and output sinusoidal signals of a same phase. The second and fourth magnetic detecting elements are arranged at the same position represented by an electrical angle and output sinusoidal signals of a same phase. A sum signal of the output signals of the first and third magnetic detecting elements and that of the output signals of the second and fourth magnetic detecting elements are obtained, thereby eliminating or remarkably reducing error components of detection signals of the first to fourth magnetic detecting elements caused by the magnetic flux of a two-pole magnet and those of the detection signals caused by rotational run out of the multi-pole magnet. A rotational angle can be detected with high accuracy.

16 Claims, 18 Drawing Sheets

(EMBODIMENT 1)

FIG.4
(a)
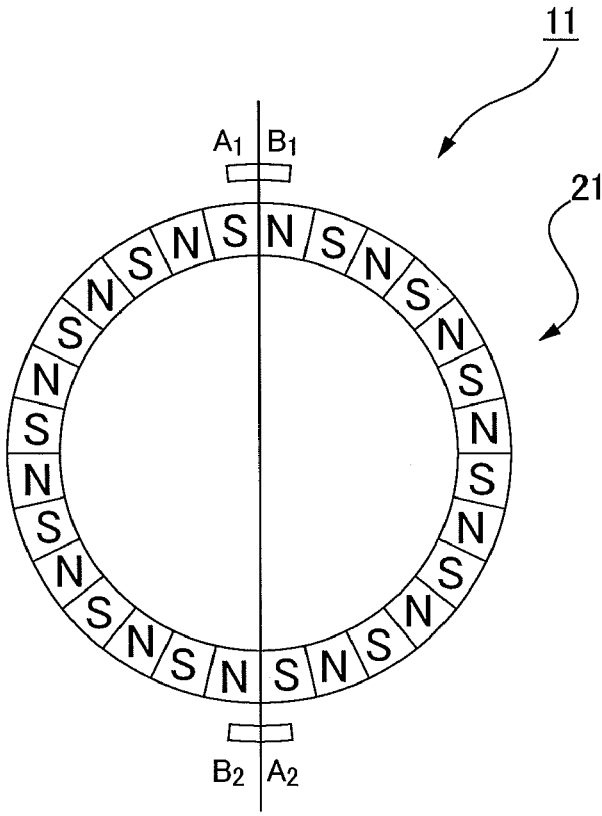
P=28
Pp=14
(b)
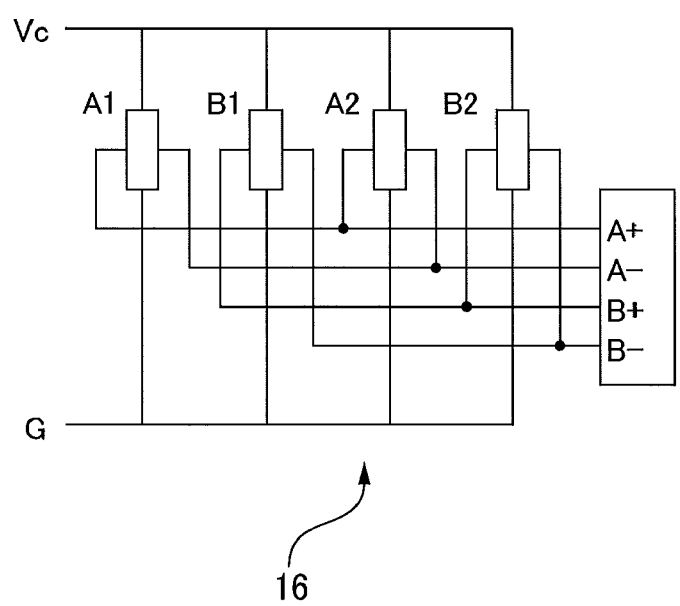

FIG.5
(a)
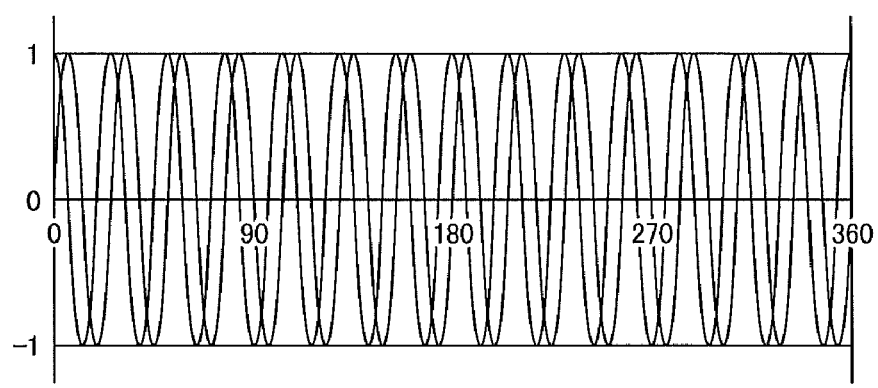
(b)
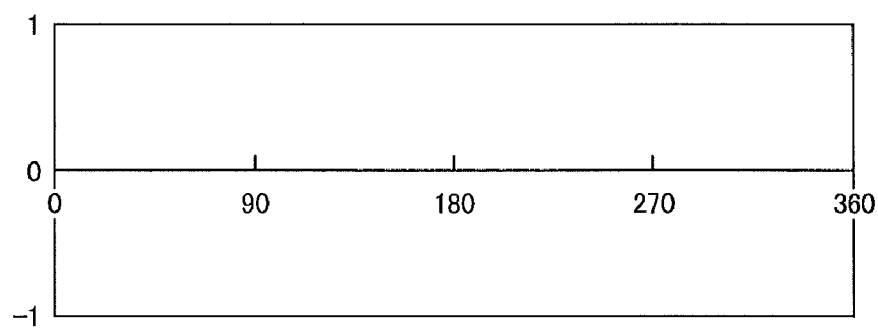

FIG.6
(a)
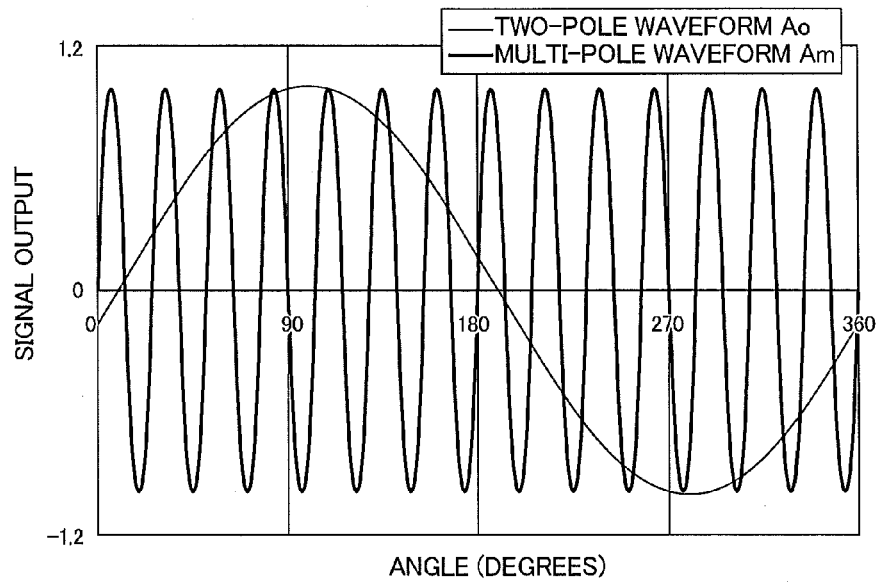
(b)
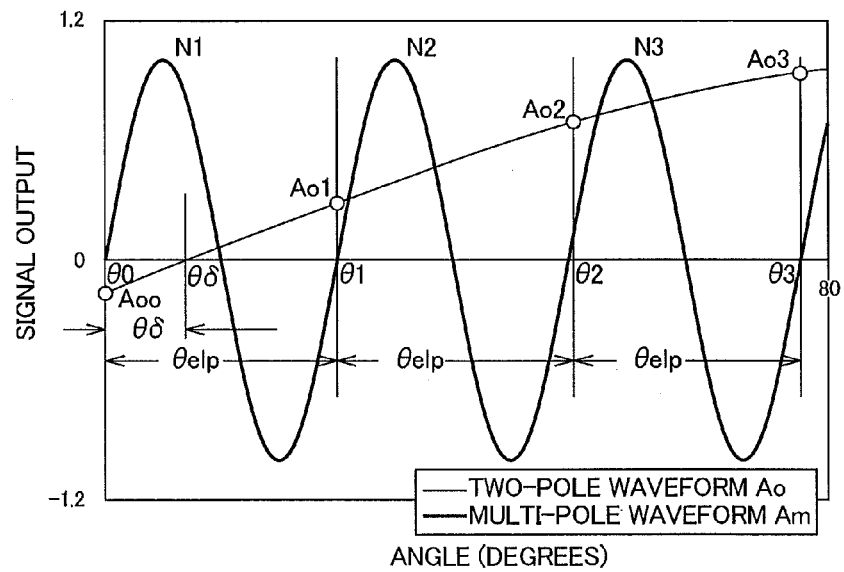

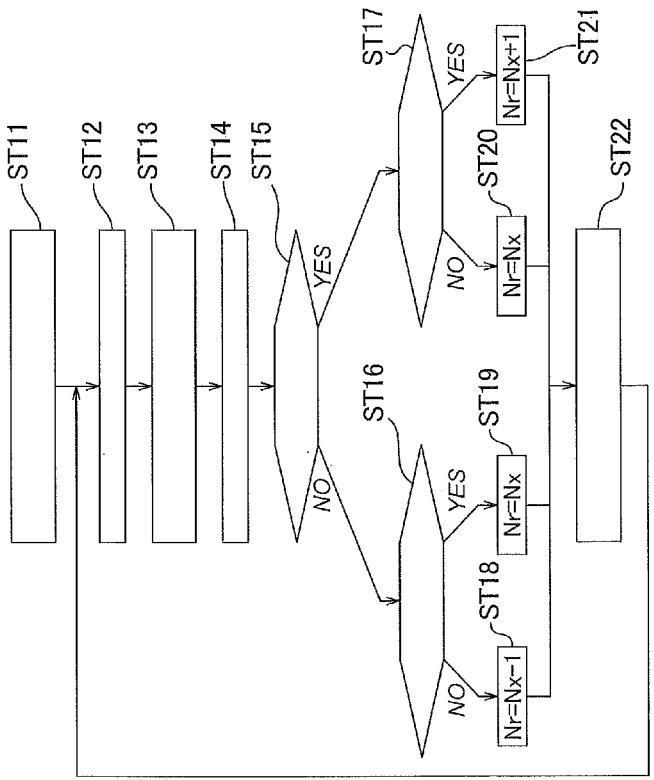

FIG.7

ST11: ASSIGN POLE-PAIR NUMBER Nx AND ANGLE $\theta$ elt OF MULTI-POLE TO EACH ANGLE $\theta$ t OF TWO-POLE
ST12: MEASURE ANGLE $\theta$ ti OF TWO-POLE
ST13: READ POLE-PAIR NUMBER Nx AND ANGLE $\theta$ elt RELATED TO $\theta$ ti
ST14: MEASURE ANGLE $\theta$ elr OF MULTI-POLE
ST15: IS $\theta$ elt GREATER THAN $\theta$ elp/2?
ST16: IS $\theta$ elr LESS THAN ($\theta$ elt + $\theta$ elp/2)?
ST17: IS $\theta$ elr LESS THAN ($\theta$ elt − $\theta$ elp/2)?
ST22: CALCULATE ABSOLUTE ANGLE $\theta$ abs USING FOLLOWING EXPRESSION: $\theta$ abs = (Nr * $\theta$ elp + $\theta$ elr)/Pp

FIG.10

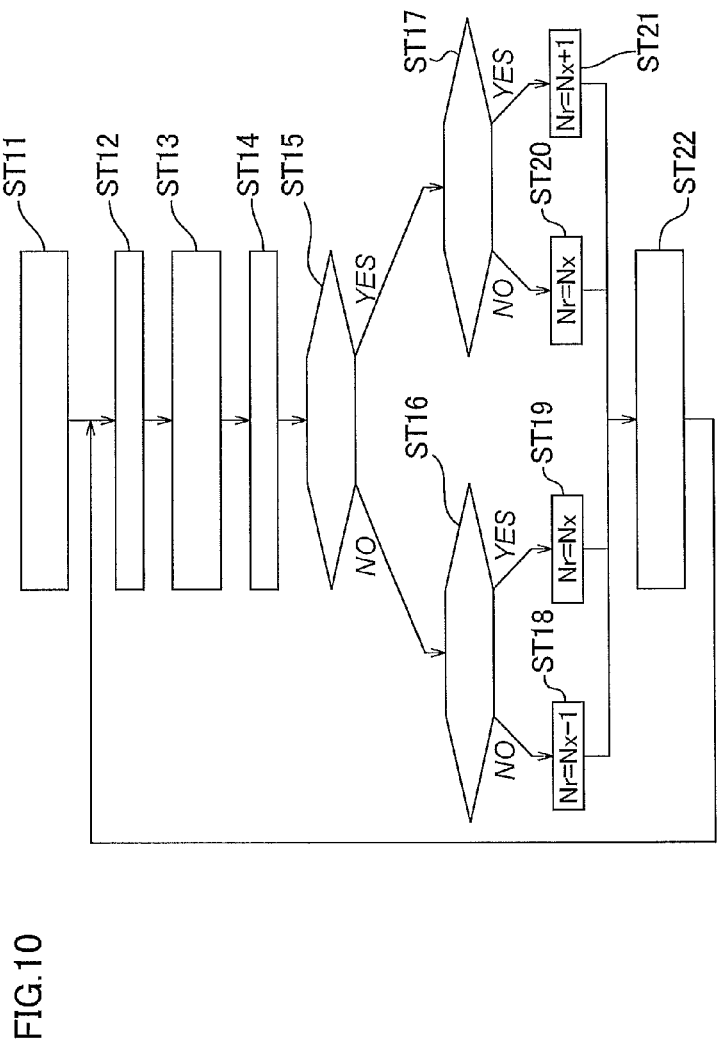

ST11: ASSIGN POLE-PAIR NUMBER Nx AND ANGLE θelt OF MULTI-POLE TO EACH ANGLE θt OF TWO-POLE
ST12: MEASURE ANGLE θti OF TWO-POLE
ST13: READ POLE-PAIR NUMBER Nx AND ANGLE θelt RELATED TO θti
ST14: MEASURE ANGLE θelr OF MULTI-POLE
ST15: IS θelt GREATER THAN θelp/M?
ST16: IS θelr LESS THAN (θelt + θelp/M)?
ST17: IS θelr LESS THAN (θelt − θelp/M)?
ST22: CALCULATE ABSOLUTE ANGLE θabs USING FOLLOWING EXPRESSION: θabs = (Nr * θelp + θelr)/Pp

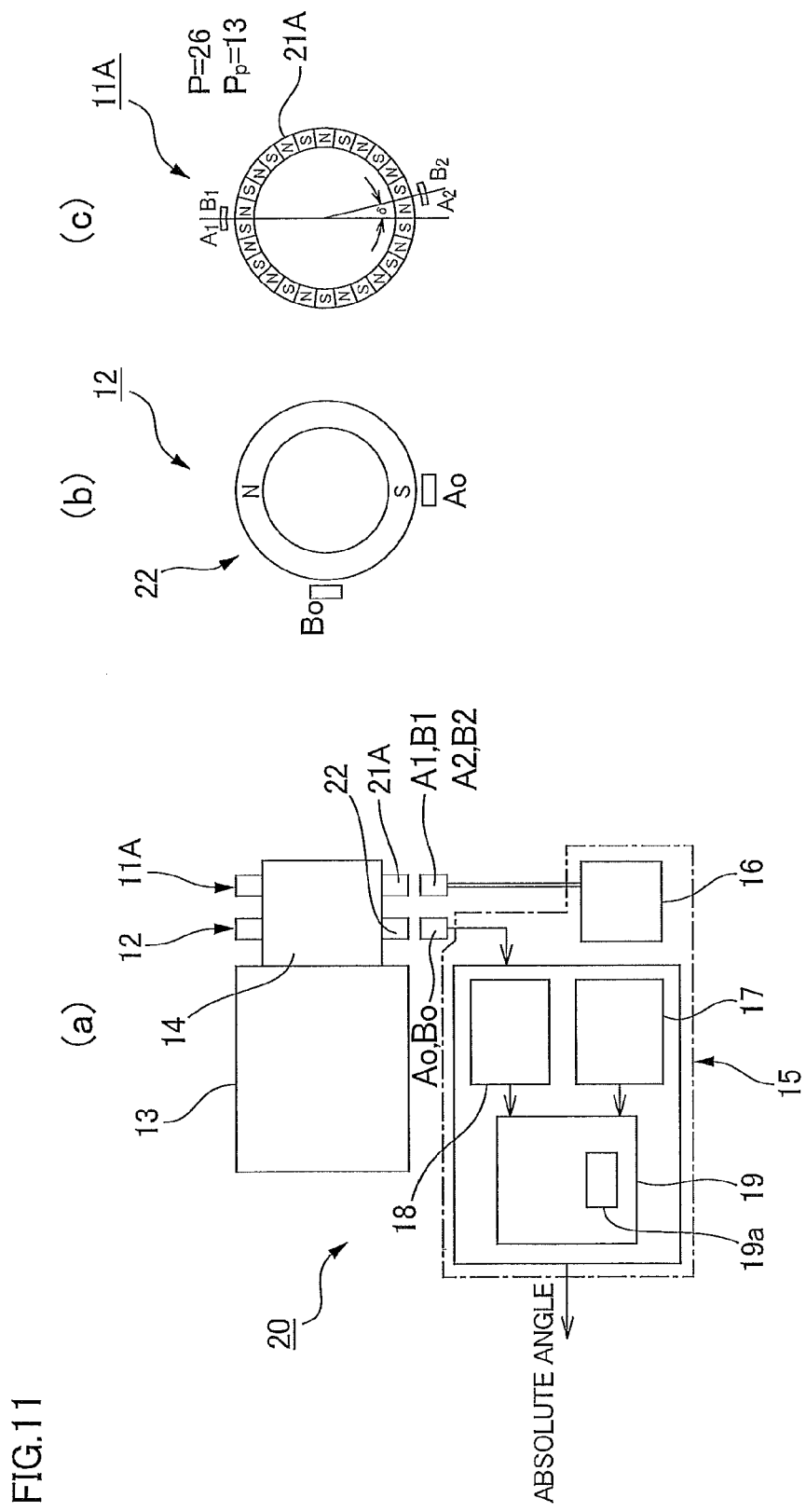

FIG.12
(a)
$P=26$
$P_p=13$
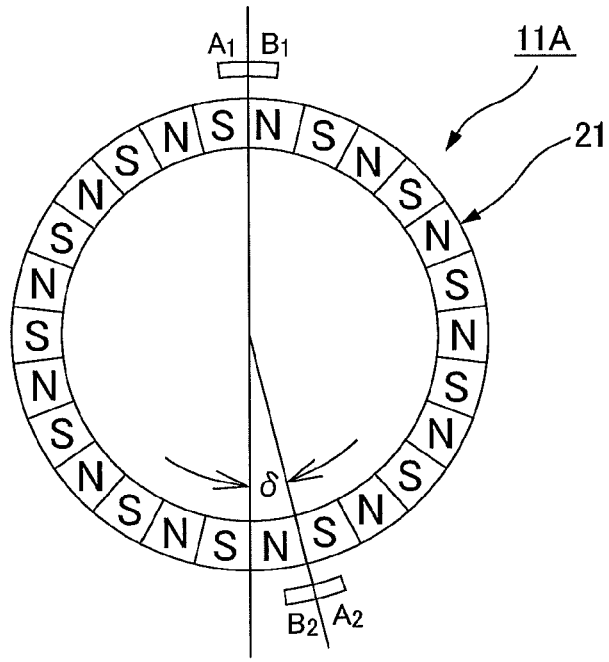
(b)
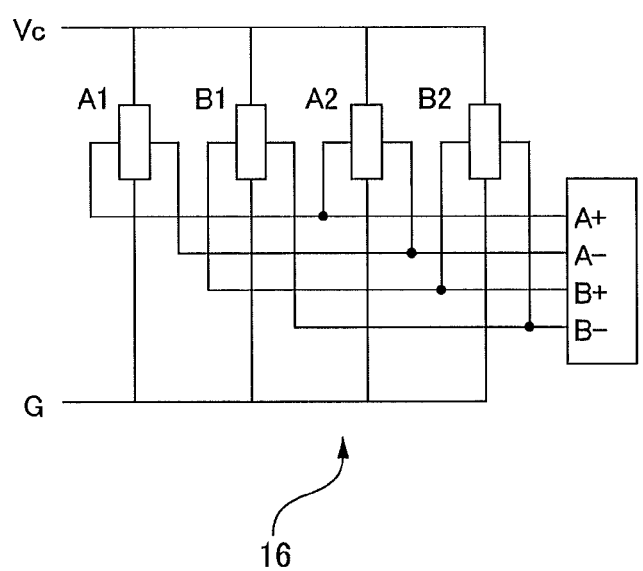

FIG.13
(a)
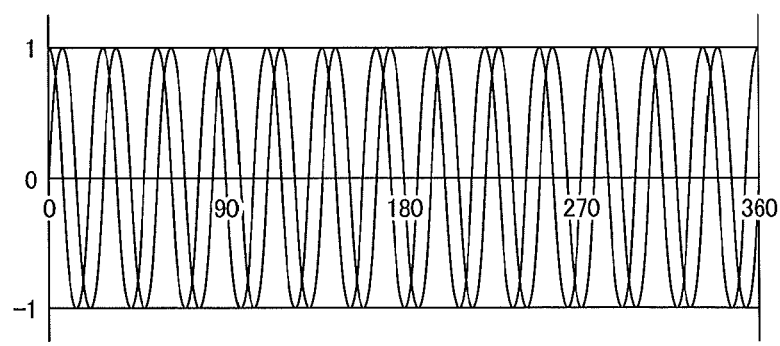
(b)
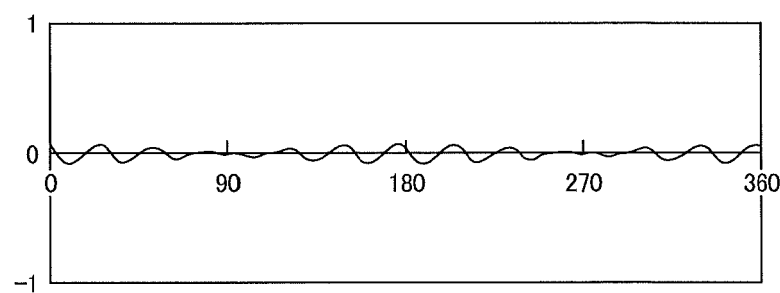

FIG.15
(a)
P=26
Pp=13
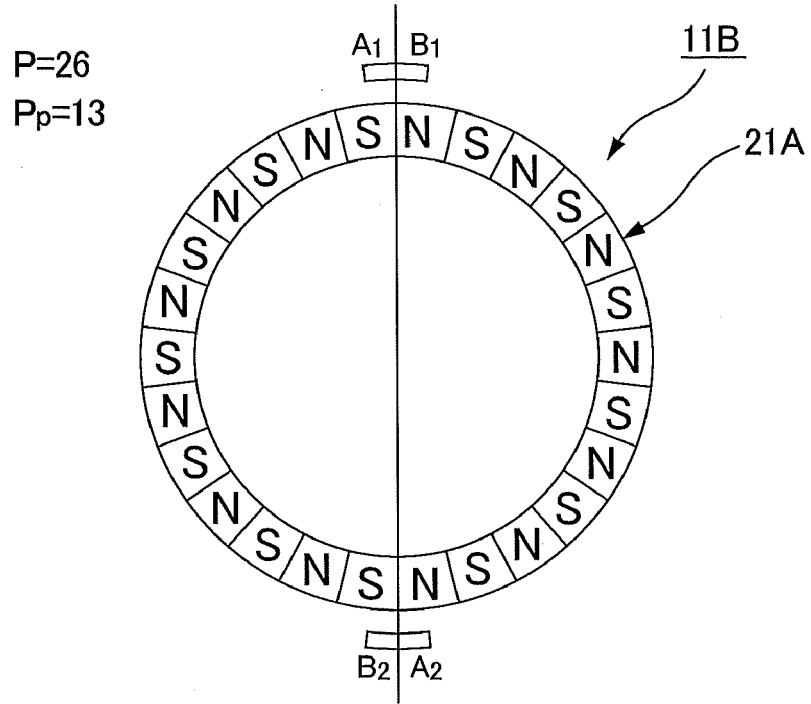
(b)
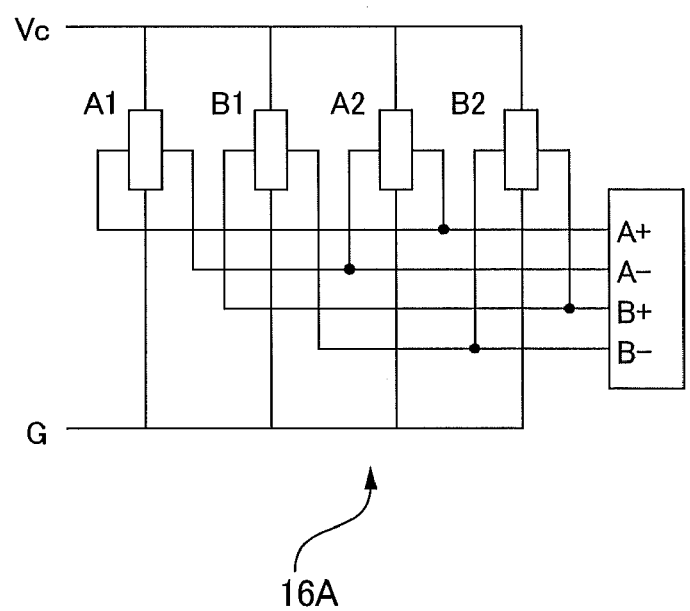

17 CALCULATION OF MULTI-POLE ANGLE θel
18 CALCULATION OF TWO-POLE ANGLE θt
19 CALCULATION OF ABSOLUTE ANGLE θabs (COMPARATIVE EXAMPLE)

FIG.17
(a)
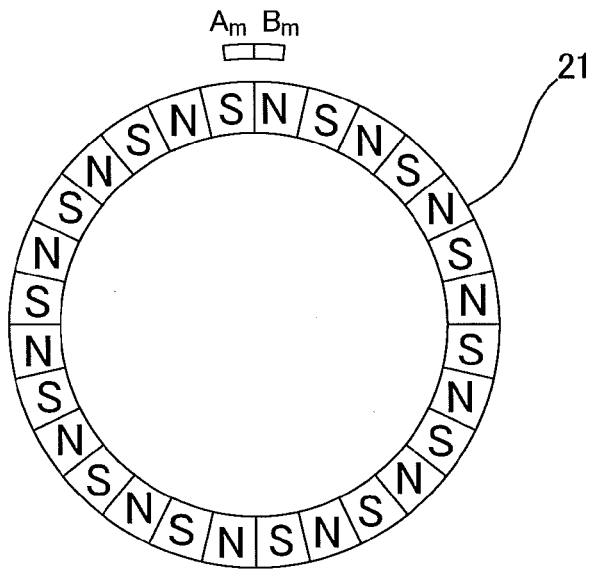
(b)
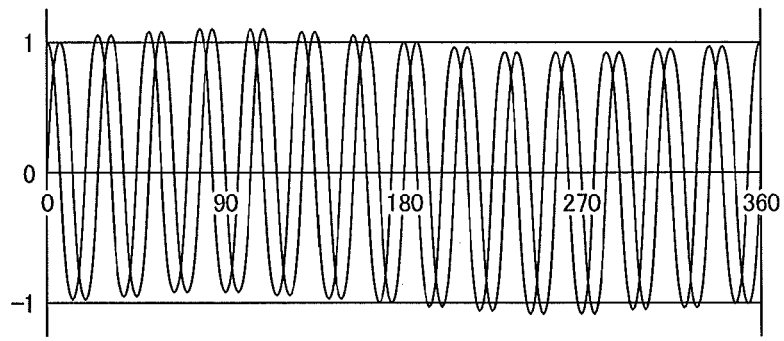
(c)
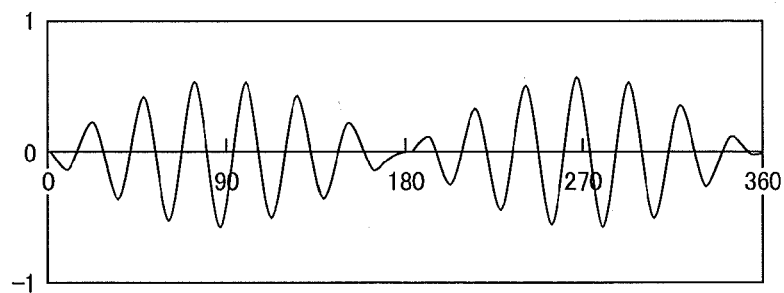

FIG.18
(a)
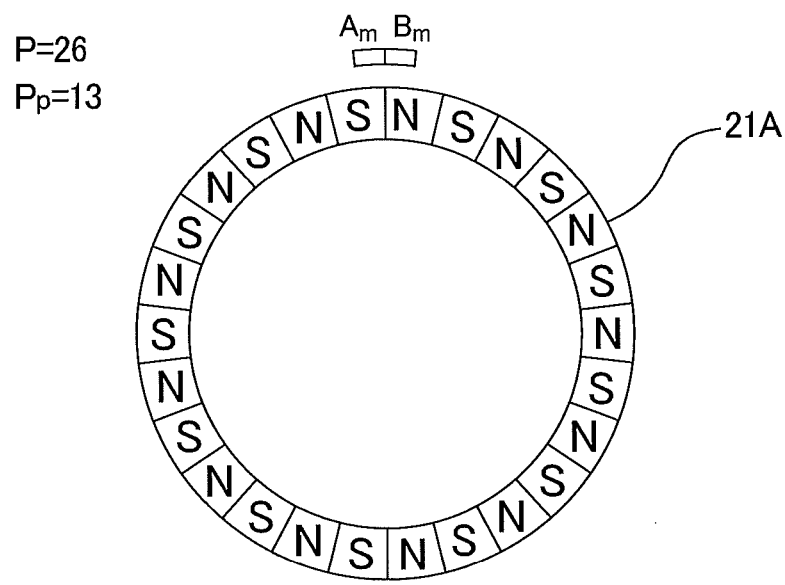
P=26
Pp=13
(b)
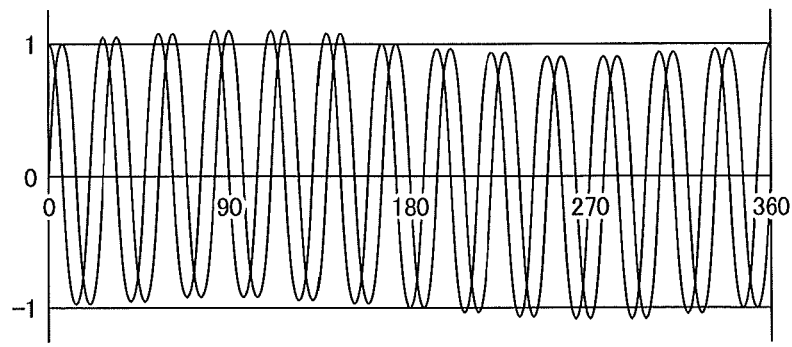
(c)
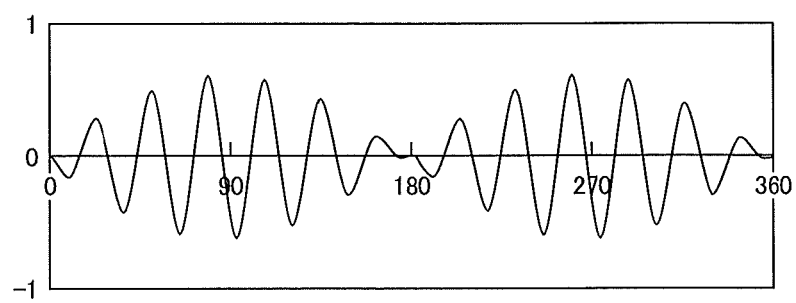

MAGNETIC ENCODER AND METHOD OF DETECTING ABSOLUTE ROTATIONAL POSITION

TECHNICAL FIELD

The present invention relates to a magnetic encoder for detecting the absolute rotational position or generating an incremental signal in accompaniment with the rotation of a rotating shaft using a multi-pole magnet. The present invention particularly relates to a magnetic encoder and a method of detecting absolute rotational position capable of detecting the absolute rotational position of a rotating shaft with good precision using a multi-pole magnet and a two-pole magnet.

BACKGROUND ART

Magnetic encoders are used for detecting the rotational position of the rotating shaft of a servo motor or the like. Such a magnetic encoder is disclosed in, e.g., Patent Documents 1 through 3. In the position detection device disclosed in Patent Document 1, a pair of Hall elements is arranged at an angular interval of 90° so that sinusoidal signals having a phase difference of 90° are detected in accompaniment with the rotation of a bipolarly magnetized magnet ring. The error component due to turbulence or the like is reduced in half by using the difference in the outputs of the Hall elements.

In the sine-cosine output sensor disclosed in Patent Document 2, four Hall elements are arranged at equiangular intervals of 90° along the external periphery of a bipolarly magnetized magnet ring, and the detection accuracy of the rotational position is improved based on the output of the Hall elements.

In the encoder device disclosed in Patent Document 3, a 12-bit absolute value output having a resolution of 4096 (64× 64) is obtained using a two-pole magnetic encoder and a 64-pole magnetic encoder in order to detect the rotational position of the rotating shaft with good precision. In this magnetic encoder, 6 upper bits are generated by the two-pole magnetic encoder, and 6 lower bits are generated by the 64-pole magnetic encoder.

[Patent Document 1] Japanese Laid-open Patent Application No. S58-162813
[Patent Document 2] Japanese Laid-open Patent Application No. 2001-050774
[Patent Document 3] Japanese Laid-open Utility Model Application No. H06-10813

Here, in a magnetic encoder in which a magnetic ring is used, fluctuations in the magnetic flux density caused by rotational runout of the magnetic ring cause the precision of the detection angle to be reduced. Also, the nonuniformity of magnetic flux density of each magnetic pole causes the precision of the detection angle to be reduced in the case that a multi-pole magnetic ring is used.

The following causes also result in a reduction in the precision of the detection angle when a bipolarly magnetized magnetic ring and multi-polarized magnetic ring are used in the manner of the encoder device disclosed in Patent Document 3. In other words, it is possible that the Hall element or another magnetic detecting element for detecting the magnetic flux of a multi-polarized magnetic ring will be affected by magnetic flux from adjacently arranged bipolarly magnetized magnetic rings, the error component of the detection signal will be multiplied, and precision of the detection angle will be reduced.

In the encoder device disclosed in Patent Document 3, the precision of the two-pole magnetic encoder must be equivalent to the 6 bits of the 64-pole magnetic encoder. The precision of the two-pole magnetic encoder must therefore be further increased in order to obtain output having higher precision, and increasing precision is therefore difficult. The start points of the output signal of the two-pole magnetic encoder and the output signal of the 64-pole magnetic encoder must be aligned, and problems are presented in that time is required to make such adjustments.

DISCLOSURE OF THE INVENTION

In view of the above, an object of the present invention is to provide a magnetic encoder that can perform angle detection with good precision using a multi-pole magnet.

Another object of the present invention is to provide a magnetic encoder capable of detecting the absolute rotational position with good precision using a multi-pole magnet and a two-pole magnet.

Yet another object of the present invention is to provide a method of detecting absolute rotational position capable of detecting the absolute rotational position with good precision using a magnetic encoder provided with a multi-pole magnet and a two-pole magnet.

In order to achieve the above-mentioned objects, the magnetic encoder of the present invention is characterized in comprising:

a multi-pole magnet in which N-poles and S-poles are formed in alternating fashion at equiangular intervals along a circumferential direction;

first and second magnetic detecting elements adjacently arranged so as to output a sinusoidal signal having a mutual phase difference of 90° in accompaniment with the rotation of the multi-pole magnet;

third and fourth magnetic detecting elements adjacently arranged so as to output a sinusoidal signal having a mutual phase difference of 90° in accompaniment with the rotation of the multi-pole magnet; and a signal processing circuit whereby a signal that represents the rotational position of the rotational shaft to which the multi-pole magnet is coaxially secured is generated on the basis of a sum signal or a differential signal of the output signal of the first magnetic detecting element and the output signal of the third magnetic detecting element, and on the basis of a sum signal or a differential signal of the output signal of the second magnetic detecting element and the output signal of the fourth magnetic detecting element, wherein the number of magnetic poles P of the multi-pole magnet is an even number of 4 or higher;

the third and fourth magnetic detecting elements are arranged at angular positions separated by a mechanical angle of about 180° along a circumferential direction of the multi-pole magnet with respect to the first and second magnetic detecting elements;

the first and third magnetic detecting elements are arranged in the same angular positions or separated by an electrical angle of 180°; and the second and fourth magnetic detecting elements are arranged in the same angular positions or separated by an electrical angle of 180°.

In the magnetic encoder of the present invention, the first and second magnetic detecting elements and the third and fourth magnetic detecting elements are arranged in positions separated by a mechanical angle of about 180°. The use of such an arrangement makes it possible to suppress a reduction in the detection precision of the magnetic detecting elements due to fluctuations in the magnetic flux density, which are caused by rotational runout of the multi-pole magnet. It is also possible to suppress a reduction in the detection precision of the magnetic detecting elements due to turbulence-induced fluctuations in the magnetic flux density. Therefore, it is possible to achieve a magnetic encoder capable of detecting the rotational position of a rotating shaft with good precision using a multi-pole magnet.

In the case that the number Pp (=P/2) of pairs of magnetic poles of the multi-pole magnet is an even number, the third and fourth magnetic detecting elements can be arranged in positions separated by a mechanical angle of substantially 180° along the circumferential direction of the multi-pole magnet with respect to the first and second magnetic detecting elements. In this case, the first and third magnetic detecting elements are arranged in the same electrical angular positions and output an in-phase sinusoidal signal. Similarly, the second and fourth magnetic detecting elements are arranged in the same electrical angular positions and output an in-phase sinusoidal signal. Therefore, in the signal processing circuit, the error component produced by rotational runout or the like of the multi-pole magnet can be removed by using a sum signal of the output signal of the first magnetic detecting element and the output signal of the third magnetic detecting element, and a sum signal of the output signal of the second magnetic detecting element and the output signal of the fourth magnetic detecting element.

In the case that the number Pp (=P/2) of pairs of magnetic poles of the multi-pole magnet is an odd number, the third and fourth magnetic detecting elements can be arranged in positions offset 360°/P clockwise or counterclockwise about a position separated by a mechanical angle of about 180° along the circumferential direction of the multi-pole magnet with respect to the first and second magnetic detecting elements. With such a configuration, the first and third magnetic detecting elements are arranged in the same electrical angular positions and output an in-phase sinusoidal signal. Similarly, the second and fourth magnetic detecting elements are arranged in the same electrical angular positions and output an in-phase sinusoidal signal. Therefore, in the signal processing circuit, the error component produced by rotational runout or the like of the multi-pole magnet can be removed by using a sum signal of the output signal of the first magnetic detecting element and the output signal of the third magnetic detecting element, and a sum signal of the output signal of the second magnetic detecting element and the output signal of the fourth magnetic detecting element.

In the case that the number Pp (=P/2) of pairs of magnetic poles of the multi-pole magnet is an odd number, the third and fourth, magnetic detecting elements can be arranged in angular positions separated by a mechanical angle of substantially 180° along the circumferential direction of the multi-pole magnet with respect to the first and second magnetic detecting elements. In this case, the first and third magnetic detecting elements are arranged in angular positions separated by an electrical angle of 180° and output opposite-phase sinusoidal signals. Similarly, the second and fourth magnetic detecting elements are arranged in angular positions separated by an electrical angle of 180° and output opposite-phase sinusoidal signals. Therefore, in the signal processing circuit, the error component produced by rotational runout or the like can be removed by using a differential signal of the output signal of the first magnetic detecting element and the output signal of the third magnetic detecting element, and on the basis a differential signal of the output signal of the second magnetic detecting element and the output signal of the fourth magnetic detecting element.

Next, the magnetic encoder of the present invention is characterized in comprising: a multi-pole magnetic detecting unit provided with multi-pole magnet having N-poles and S-poles formed in alternating fashion at equiangular intervals along a circumferential direction, first and second magnetic detecting elements adjacently arranged so as to output a sinusoidal signal having a mutual phase difference of 90° in accompaniment with the rotation of the multi-pole magnet, and third and fourth magnetic detecting elements adjacently arranged so as to output a sinusoidal signal having a mutual phase difference of 90° in accompaniment with the rotation of the multi-pole magnet;

a two-pole magnetic detecting unit provided with a two-pole magnet bipolarly magnetized at equiangular intervals along the circumferential direction, and a pair of magnetic detecting elements for outputting a sinusoidal signal having a mutual phase difference of 90° in accompaniment with the rotation of the two-pole magnet; and a signal processing circuit whereby a signal that represents a mechanical angular absolute position $\theta abs$ within one rotation of the rotational shaft to which the two-pole magnet and the multi-pole magnet are coaxially secured is generated on the basis of the output signals of the first through fourth magnetic detecting elements and the output signals of the pair of magnetic detecting elements, wherein the number of poles P of the multi-pole magnet is an even number of four or more;

the third and fourth magnetic detecting elements are arranged in positions separated by a mechanical angle of about 180° along a circumferential direction of the multi-pole magnet with respect to the first and second magnetic detecting elements;

the first and third magnetic detecting elements are arranged in the same electrical angular positions or in angular positions separated by 180°; and the second and fourth magnetic detecting elements are arranged in the same electrical angular positions or in angular positions separated by 180°.

In this configuration, when the number Pp (=P/2) of pairs magnetic poles of the multi-pole magnet is an even number, the third and fourth magnetic detecting elements can be arranged in positions separated by a mechanical angle of exactly 180° along the circumferential direction of the multi-pole magnet with respect to the first and second magnetic detecting elements. In this case, the first and third magnetic detecting elements are arranged in the same electrical angular positions, and output in-phase sinusoidal signals. Similarly, the second and fourth magnetic detecting elements are also arranged in the same electrical angular positions, and output in-phase sinusoidal signals. In the signal processing circuit, a sum signal of the output signal of the first magnetic detecting element and the output signal of the third magnetic detecting element is used, as is a sum signal of the output signal of the second magnetic detecting element and the output signal of the fourth magnetic detecting element. On the basis of these signals, a signal that represents an absolute position $\theta elr$ within 1/Pp rotation of the rotational shaft is generated.

Thus, the error component of the output signals due to rotational runout of the multi-pole magnet can be removed by combining the output signals of the magnetic detecting elements, which are disposed in angular positions separated by a mechanical angle of 180°. Also, the error component of the output signal due to the magnetic flux from the two-pole magnet can be removed by combining the in-phase sinusoidal signals. Accordingly, the absolute position $\theta elr$ of the rotating shaft can be detected with good precision.

In contrast, in the case that the number Pp (=P/2) of pairs of magnetic poles of the multi-pole magnet is an odd number, the third and fourth magnetic detecting elements are arranged in positions offset 360°/P clockwise or counterclockwise about a position separated by a mechanical angle of about 180° along the circumferential direction of the multi-pole magnet with respect to the first and second magnetic detecting elements. In this manner, the first and third magnetic detecting elements are arranged in the same electrical angular positions and output in-phase sinusoidal signals. Similarly, the second and fourth magnetic detecting elements are arranged in the same electrical angular positions and output in-phase sinusoidal signals. In the signal processing circuit, a signal that represents an absolute position θelr within 1/Pp rotation of the rotational shaft is generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

In this case, the error component of the output signals due to rotation runout of the multi-pole magnet can be removed by combining the output signals of the magnetic detecting elements, which are in angular positions separated by a mechanical angle of 180°. Also, the error component of the output signal due to the magnetic flux from the two-pole magnet can be removed by combining the in-phase sinusoidal signals. Accordingly, the absolute position θelr of the rotating shaft can be detected with good precision.

Here, when the effect of the magnetic flux from the two-pole magnet is low such as when the two-pole magnet is arranged away from the multi-pole magnet, or when the two magnets are magnetically shielded from each other, the third and fourth magnetic detecting elements can be arranged in positions separated by a mechanical angle of exactly 180° along the circumferential direction of the multi-pole magnet in relation to the first and second magnetic detecting elements in the case that the number Pp (=P/2) of pairs of magnetic poles of the multi-pole magnet is an odd number.

In this case, the first and third magnetic detecting elements are arranged in positions separated by an electrical angle of 180° and output opposite-phase sinusoidal signals. Similarly, the second and fourth magnetic detecting elements are arranged in positions separated by an electrical angle of 180° and output opposite-phase sinusoidal signals. In the signal processing circuit, a signal that represents an absolute position θelr within 1/Pp rotation of the rotational shaft is generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

Since opposite-phase sinusoidal signals are combined, the error component of the output signals due to the magnetic flux from the two-pole magnet cannot be removed, but since the output signals of the magnetic detecting elements are disposed in angular positions separated by a mechanical angle of 180°, the error component of the output signals due to rotational runout of the multi-pole magnet can be removed. Such a configuration can be used when the magnetic flux from the two-pole magnet produces a low error component that appears in the output signals of the first to fourth magnetic detecting elements of the multi-pole magnet-side.

Next, the present invention provides a method of detecting absolute rotational position for detecting a mechanical angle absolute position θabs within one rotation of a rotating shaft using the magnetic encoder having the above-described configuration provided with a multi-pole magnet and a two-pole magnet, the method characterized in that:

in advance of an operation for detecting the rotational position of the rotating shaft, the rotating shaft is caused to rotate, the absolute value θelt obtained from the multi-pole magnetic detecting unit is measured and assigned to the absolute values θt obtained from the two-pole magnetic detecting unit, and the temporary pole-pair number Nx of the multi-pole magnet is assigned to the absolute values θt obtained from the two-pole magnetic detecting unit;

wherein, when detection of the rotational position of the rotating shaft is started, the absolute value θti of the rotating shaft according to the two-pole magnetic detecting unit is measured;

the absolute value θelr of the rotating shaft according to the multi-pole magnetic detecting unit is measured;

the temporary pole-pair number Nx assigned to the absolute value θti is corrected and the pole-pair number Nr is calculated on the basis of the absolute value θelt assigned to the measured absolute value θti and on the basis of the measured absolute value θelr; and a mechanical angle absolute position θabs within one rotation of the rotating shaft is calculated according to the following formula using a mechanical angle θelp (=360°/Pp) that corresponds to an electrical angle of one period of an output signal of the multi-pole magnetic detecting unit.

$$\theta abs=(Nr\times\theta elp+\theta elr)/Pp$$

An accurate pole-pair number Nr can be determined from the temporary pole-pair number Nxi as below when the precision or angular reproducibility X of the two-pole absolute-value encoder satisfies the following equation, where Rt is a resolution of the two-pole absolute-value encoder.

$$X<2\times((\theta elp/2)-(Pp\times\theta elp/Rt))/Pp$$

Specifically, when θelt≧θelp/2, the corrected pole-pair number Nr is set to Nx if θelr≧(θelt−θelp/2), and the corrected pole-pair number Nr is set to Nx+1 if θelr<(θelt−θelp/2).

Conversely, when θelt<θelp/2, the corrected pole-pair number Nr is set to Nx if θelr<(θelt+θelp/2), and the corrected pole-pair number Nr is set to Nx−1 if θelr≧(θelt+θelp/2).

The angular reproducibility X of the two-pole absolute-value encoder may be set so as to satisfy the following equation, where Rtmin is the minimum value of the resolution of the two-pole absolute-value encoder for each of the magnetic pole pairs of the multi-pole absolute-value encoder.

$$X<2\times((\theta elp/2)-(\theta elp/Rt\min))/Pp$$

Generally, an accurate pole-pair number Nr can be determined from the temporary pole-pair number Nxi as below when the precision or angular reproducibility X of the two-pole absolute-value encoder satisfies the following equation, where M is an integer equal to or greater than 2.

$$X<2\times((\theta elp/M)-(Pp\times\theta elp/Rt))/Pp$$

When θelt≧θelp/M, the corrected pole-pair number Nr is set to Nx if θelr≧(θelt−θelp/M), and the corrected pole-pair number Nr is set to Nx+1 if θelr<(θelt−θelp/M).

When θelt<θelp/2, the corrected pole-pair number Nr is set to Nx if θelr<(θelt+θelp/M), and the corrected pole-pair number Nr is set to Nx−1 if θelr≧(θelt+θelp/M).

The angular reproducibility X of the two-pole absolute-value encoder may be set so as to satisfy the following equation, where Rtmin is the minimum value of the resolutions of the two-pole absolute-value encoder for each of the magnetic pole pairs of the multi-pole absolute-value encoder.

$$X<2\times((\theta elp/M)-(\theta elp/Rt\min))/Pp$$

According to the method of detecting absolute rotational position of the present invention, the resolution for detecting the absolute position of the rotating shaft is prescribed by Pp×Rm, where Rm is the resolution of the multi-pole absolute-value encoder. Detection precision is dependent solely on the resolution of the multi-pole absolute-value encoder. The resolution and precision of the two-pole absolute-value encoder have no relation to the resolution and precision of detection of the absolute position and are employed only to obtain the pole-pair number. A magnetic absolute-value encoder having high resolution can therefore be implemented according to the present invention without increasing the resolution and precision of the two-pole absolute-value encoder.

BRIEF DESCRIPTION OF THE DRAWINGS

FIG. 4 is a descriptive view and a signal-wiring diagram of the multi-pole magnetic detecting unit of FIG. 3;

FIG. 5 is a view that shows the A-phase signal waveform and the B-phase signal waveform presented to the signal processing circuit of FIG. 3, and that shows the error component due to the magnetic flux from the two-pole magnet;

FIG. 6 is a signal waveform showing the output waveforms of the two-pole magnetic detecting unit and the multi-pole magnetic detecting unit of FIG. 3, and a descriptive view showing the state in which a portion of the signal waveform has been elongated in the time axis direction;

FIG. 7 is a flowchart showing the process flow of calculating the mechanical angle absolute position;

FIG. 10 is a flowchart showing the process flow of calculating the mechanical angle absolute position;

FIG. 11 is a schematic block view showing the magnetic encoder of embodiment 3 of the present invention, a descriptive view showing the two-pole magnetic detecting unit of the magnetic encoder, and the multi-pole magnetic detecting unit of the magnetic encoder;

FIG. 12 is a descriptive view and a signal-wiring diagram of the multi-pole magnetic detecting unit of FIG. 11;

FIG. 13 is a view that shows the A-phase signal waveform and the B-phase signal waveform presented to the signal processing circuit of FIG. 11, and that shows the error component due to the magnetic flux from the two-pole magnet;

FIG. 15 is a descriptive view and a signal-wiring diagram of the multi-pole magnetic detecting unit of FIG. 14;

FIG. 17 is a descriptive view of the multi-pole magnetic detecting unit in the comparative example, a signal waveform diagram showing the A-phase signal waveform and the B-phase signal waveform presented to the signal processing circuit, and a diagram showing the error component due to the magnetic flux from the two-pole magnet; and FIG. 18 is a descriptive view of the multi-pole magnetic detecting unit in the comparative example, a signal waveform diagram showing the A-phase signal waveform and the B-phase signal waveform presented to the signal processing circuit, and a diagram showing the error component due to the magnetic flux from the two-pole magnet.

BEST MODE FOR CARRYING OUT THE INVENTION

Embodiments of a magnetic encoder in which the present invention is applied will be described below with reference to the drawings.

Embodiment 1)

Figure 1:
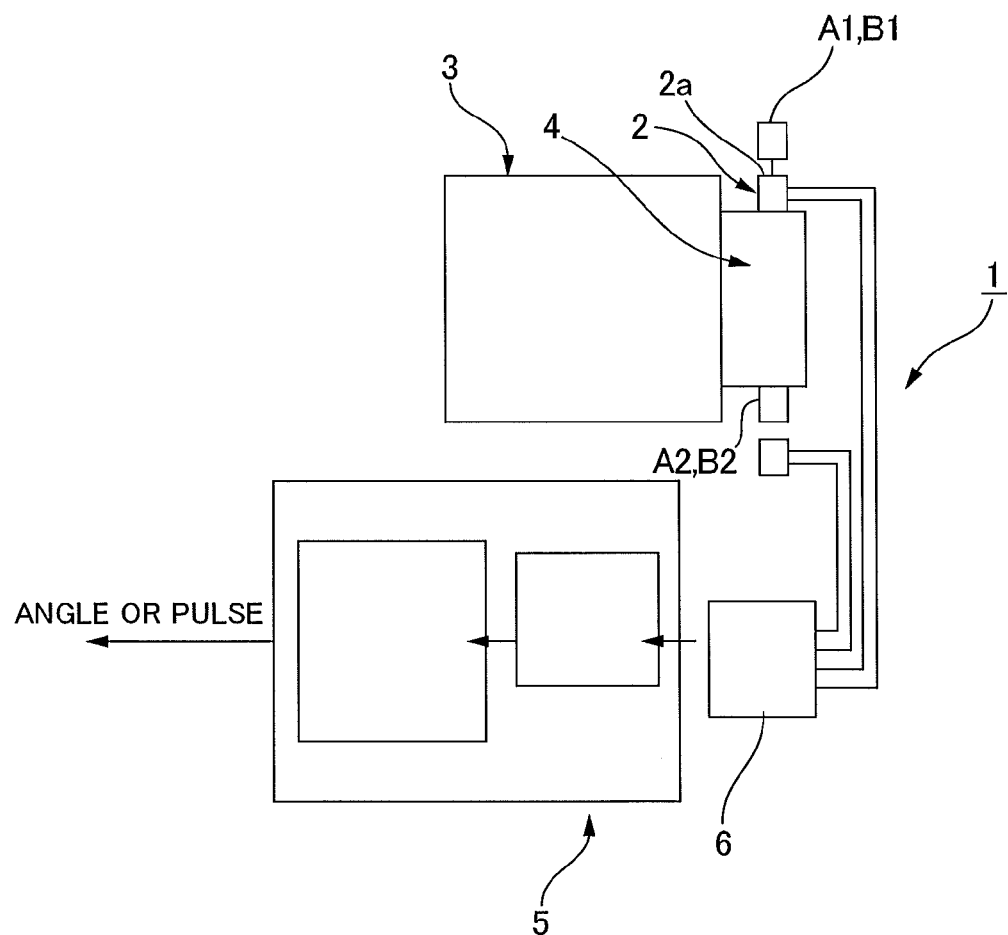
FIG. 1 is a schematic block diagram showing the magnetic encoder of embodiment 1 of the present invention.

FIG. 1 is a schematic block diagram showing a magnetic encoder provided with a multi-pole magnet in which the present invention has been applied. The magnetic encoder 1 has a multi-pole magnet 2 in which N-poles and S-poles are formed in alternating fashion at equiangular intervals along the circumferential direction, first and second magnetic detecting elements A1, B1 adjacently arranged along the circular external peripheral surface 2a of the multi-pole magnet 2, third and fourth magnetic detecting elements A2, B2 adjacently arranged along the circular external peripheral surface 2a of the multi-pole magnet, and a signal processing circuit 5 for generating signals that represent the rotational position of a rotating shaft of a structure in which detection is to be carried out, e.g., a rotating shaft 4 of a servo motor 3, wherein the signals are generated on the basis of the first to fourth magnetic detecting elements A1 to B2.

Figure 2:
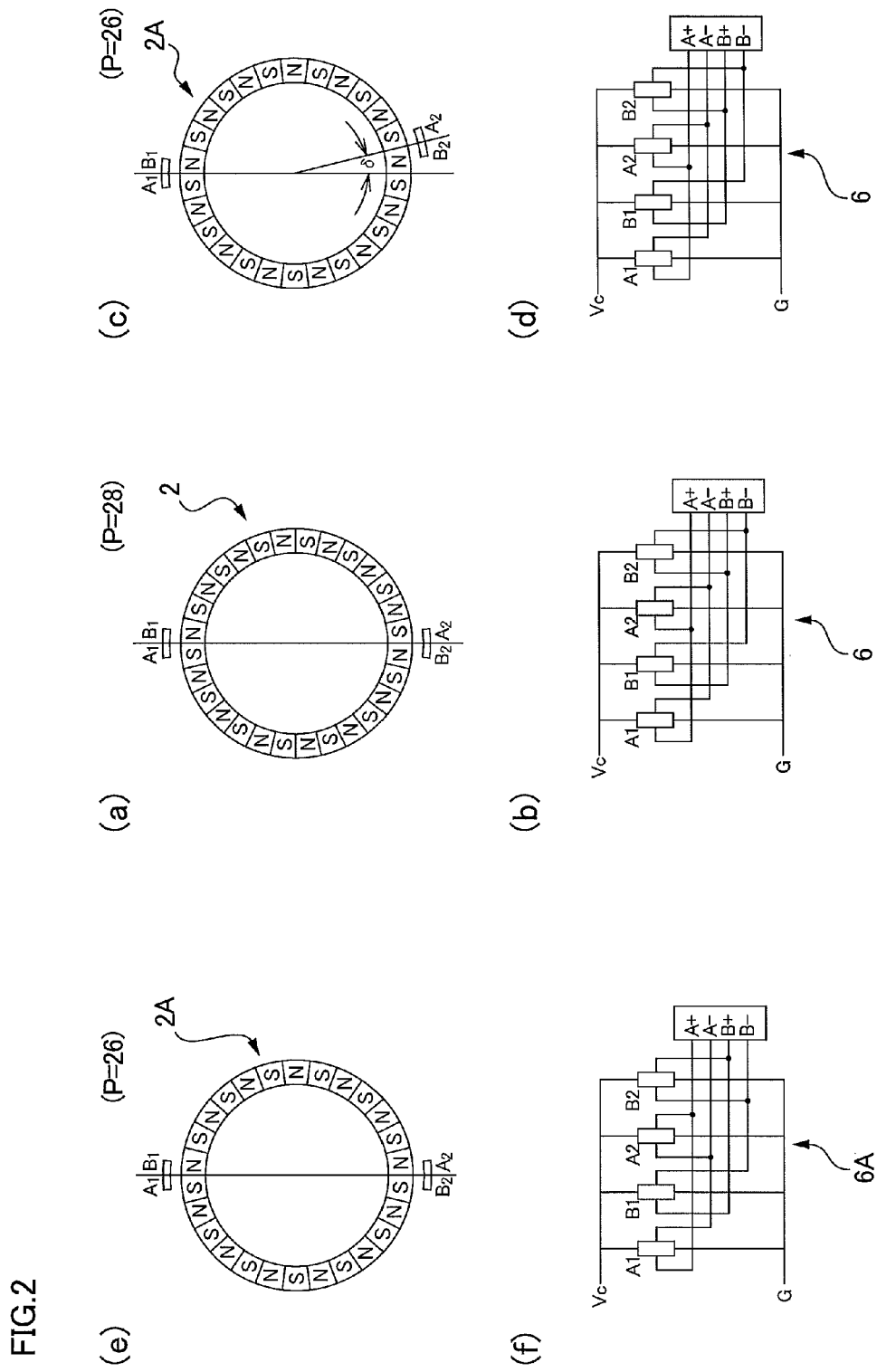
FIG. 2 is a descriptive view and a signal-wiring diagram of the magnetic detecting unit of FIG. 1.

FIGS. 2(a) and 2(b) are a descriptive view and an output signal-wiring diagram showing the magnetic detecting unit of the magnetic encoder 1. The multi-pole magnet 2 of the present example has N-poles and S-poles formed in an alternating fashion in the circumferential direction at equiangular intervals so that the number P of magnetic poles is 28. The first and second magnetic detecting elements A1, B1 are adjacently arranged so as to be separated by an electrical angle of 90° and sinusoidal signals having a mutual phase difference of 90° are outputted in accompaniment with the rotation of the multi-pole magnet 2. In other words, the first and second magnetic detecting elements A1, B1 are adjacently arranged so that the distance between the elements in the circumferential direction is equal to ½ the distance of the magnetic pole width. Similarly, the third and fourth magnetic detecting elements A2, B2 are adjacently arranged so as to be separated by an electrical angle of 90° and sinusoidal signals having a mutual phase difference of 90° are outputted.

The first and second magnetic detecting elements A1, B1 and the third and fourth magnetic detecting elements A2, B2 are arranged in angular positions separated by a mechanical angle of 180° along the circumferential direction of the multi-pole magnet 2. The first and third magnetic detecting elements A1, A2 are arranged in the same electrical angular positions and output in-phase sinusoidal signals because the number of poles P of the multi-pole magnet 2 is 28, resulting in an even number of 14 magnetic pole pairs Pp. The second and fourth magnetic detecting elements B1, B2 are also arranged in the same electrical angular positions and output in-phase sinusoidal signals.

The signal processing circuit 5 is provided with a signal combining circuit 6 wired in the manner shown in FIG. 2(b). A sum signal A+ of the output signal of the first magnetic detecting element A1 and the output signal of the third magnetic detecting element A2, and an inverted signal A− of the sum signal A+ are obtained in the signal combining circuit 6. Also obtained are a sum signal B+ of the output signal of the second magnetic detecting element B1 and the output signal of the fourth magnetic detecting element B2, and an inverted signal B− of the sum signal B+. On the basis of these signals, signals that represent the rotational position of the rotating shaft 4 are generated and outputted by the signal processing circuit 5.

The first and second magnetic detecting elements A1, B1 and the third and fourth magnetic detecting elements A2, B2 are arranged in the magnetic encoder 1 of the present example in angular positions separated by the mechanical angle of 180°. The use of such an arrangement makes it possible to suppress a reduction in the detection precision of the magnetic detecting elements A1 to B2 due to fluctuations in the magnetic flux density, which are caused by rotational runout of the multi-pole magnet 2. It is also possible to suppress a reduction in the detection precision of the magnetic detecting elements A1 to B2 due to turbulence-induced fluctuations in the magnetic flux density. Therefore, it is possible to achieve a magnetic encoder capable of detecting the rotational position of a rotating shaft 4 with good precision using a multi-pole magnet 2.

Here, the third and fourth magnetic detecting elements A2, B2 can be arranged in positions offset by δ (=360°/P) clockwise or counterclockwise about a position separated by a mechanical angle of 180° along the circumferential direction of the multi-pole magnet 2 with respect to the first and second magnetic detecting elements A1, B1 in the case that the number Pp (=P/2) of pairs of magnetic poles of the multi-pole magnet 2 is an odd number.

For example, the positions can be offset by a mechanical angle δ=360°/26 from the position of 180° in the case that the number P of magnetic poles of the multi-pole magnet 2A is 26 and the number of magnetic pole pairs Pp is 13, as shown in FIG. 2(c). In such a configuration, the first and third magnetic detecting elements A1, A2 are arranged in the same electrical angular positions and output an in-phase sinusoidal signal. Similarly, the second and fourth magnetic detecting elements B1, B2 are also arranged in the same electrical angular positions and output an in-phase sinusoidal signal.

Therefore, the sum signal A+ of the output signal of the first magnetic detecting element A1 and the output signal of the third magnetic detecting element A2, and the sum signal of the output signal of the second magnetic detecting element B1 and the output signal of the fourth magnetic detecting element B2 are obtained in the signal combining circuit 6, as shown in FIG. 2(d), whereby the error component produced by the rotational runout of the multi-pole magnet 2A and the error component produced by the turbulence magnetic flux can be removed.

Also, when the number Pp (=P/2) of pairs of magnetic poles of the multi-pole magnet 2A is an odd number, the first and second magnetic detecting elements A1, B1 and the third and fourth magnetic detecting elements A2, B2 can be arranged in angular positions separated by a mechanical angle of exactly 180° along the circumferential direction of the multi-pole magnet 2A. FIG. 2(e) shows the case in which the number P of magnetic poles is 26 and the number Pp of pairs of magnetic poles is 13. In this case, the first and third magnetic detecting elements A1, A2 are arranged in angular positions separated by an electrical angle of 180° and output opposite-phase sinusoidal signals. Similarly, the second and fourth magnetic detecting elements B1, B2 are arranged in angular positions separated by an electrical angle of 180° and output opposite-phase sinusoidal signals. Therefore, the first and third magnetic detecting elements A1, A2 are connected in parallel, and the differential signal A+ of the output signals and an inverted signal A− of the differential signal A+ are obtained in the signal combining circuit 6A, as shown in FIG. 2(f). Also obtained in similar fashion are a differential signal B+ of the output signal of the second magnetic detecting element B1 and the output signal of the fourth magnetic detecting element B2, and an inverted signal B− of the differential signal B+. The error component due to rotational runout of the rotating shaft can be removed on the basis of a combination of these signals.

(Embodiment 2)

Figure 3:
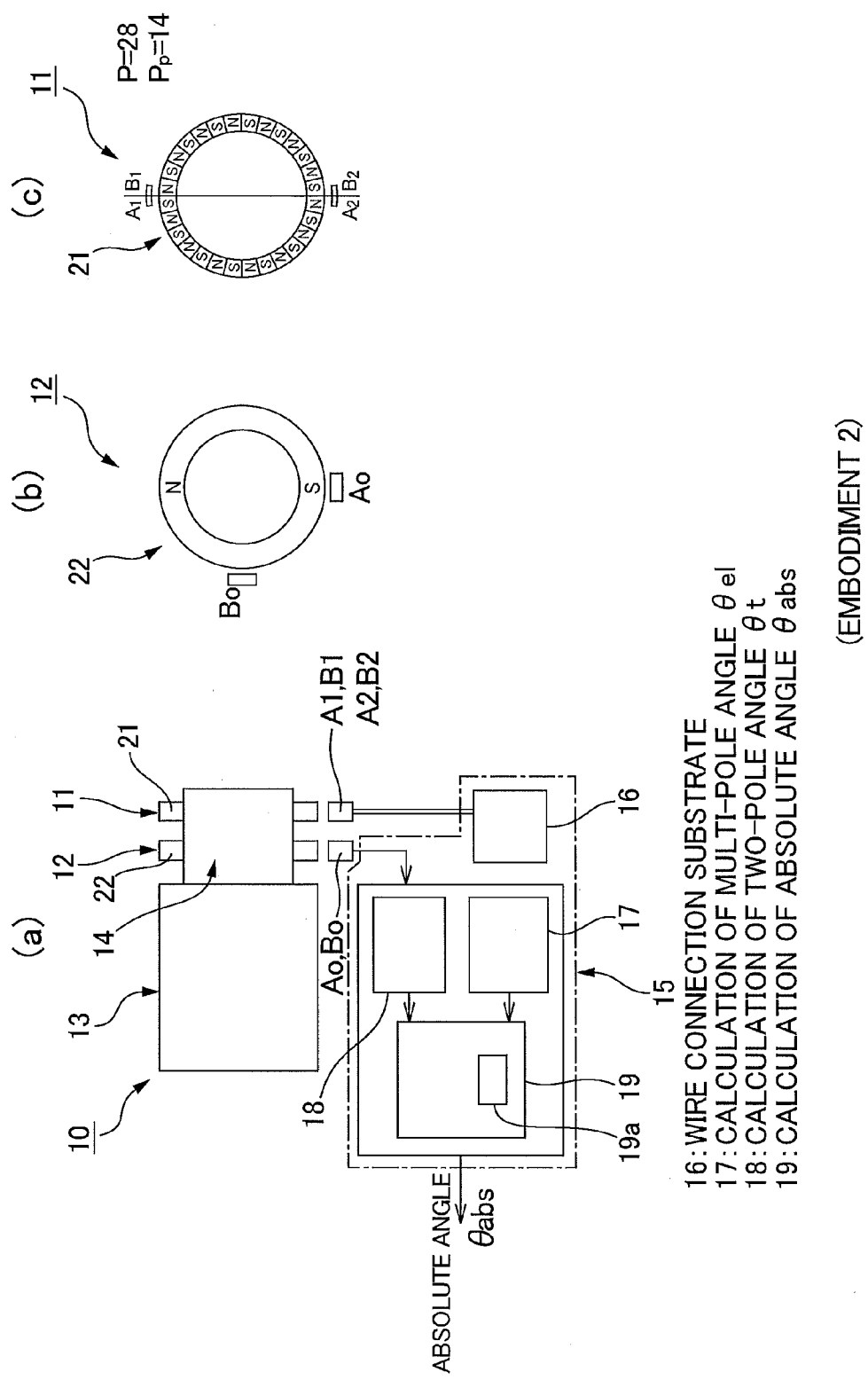
FIG. 3 is a schematic block diagram showing the magnetic encoder of embodiment 2 of the present invention, a descriptive view showing the two-pole magnetic detecting unit of the magnetic encoder, and a descriptive view showing the multi-pole magnetic detecting unit of the magnetic encoder.

Next, FIGS. 3(a) to 3(c) are a schematic block diagram showing the magnetic encoder of embodiment 2 in which the present invention has been applied, a descriptive view showing the two-pole magnetic detecting unit of the magnetic encoder, and a descriptive view showing the multi-pole magnetic detecting unit of the magnetic encoder.

The magnetic encoder 10 has a multi-pole magnetic detecting unit 11, a two-pole magnetic detecting unit 12, and a signal processing circuit 15 for generating signals that represent the mechanical absolute position θabs within one rotation of a rotating shaft of a structure in which detection is to be carried out, e.g., a rotating shaft 14 of a servo motor 13, wherein the signals are generated on the basis of the signals obtained from the detection parts 11, 12.

The multi-pole magnetic detecting unit 11 has a multi-pole magnet 21 in which N-poles and S-poles are formed in alternating fashion at equiangular intervals along the circumferential direction, first and second magnetic detecting elements A1, B1 adjacently arranged so as to output sinusoidal signals having a mutual phase difference of 90° in accompaniment with the rotation of the multi-pole magnet 21, and third and fourth magnetic detecting elements A2, B2 adjacently arranged so as to output sinusoidal signals having a mutual phase difference of 90° in accompaniment with the rotation of the multi-pole magnet 21. The two-pole magnetic detecting unit 12 is provided with a two-pole magnet 22 bipolarly magnetized at equiangular intervals along the circumferential direction, and a pair of magnetic detecting elements Ao, Bo for outputting sinusoidal signals having a mutual phase difference of 90° in accompaniment with the rotation of the two-pole magnet 22. The multi-pole magnet 21 and the two-pole magnet 22 are coaxially secured to the rotating shaft 14 and are caused to rotate integrally with the rotating shaft 14.

FIGS. 4(a) and 4(b) is a descriptive view and an output signal-wiring diagram of the multi-pole magnetic detecting unit 11. The multi-pole magnetic detecting unit 11 has the same structure as the magnetic detecting unit shown in FIGS. 1, 2(a), and 2(b). In other words, the multi-pole magnet 21 has N-poles and S-poles formed in alternating fashion in the circumferential direction at equiangular intervals so that the number P of magnetic poles is 28. The first and second magnetic detecting elements A1, B1 are adjacently arranged so as to be separated by an electrical angle of 90° and to output sinusoidal signals having a mutual phase difference of 90° in accompaniment with the rotation of the multi-pole magnet 21. In other words, the first and second magnetic detecting elements A1, B1 are adjacently arranged so that the distance between the elements in the circumferential direction is equal to ½ the distance of the magnetic pole width. Similarly, the third and fourth magnetic detecting elements A2, B2 are adjacently arranged so as to be separated by an electrical angle of 90° and to output sinusoidal signals having a mutual phase difference of 90°. Similarly, the third and fourth magnetic detecting elements A2, B2 are also adjacently arranged so as to be separated by an electrical angle of 90° and to output sinusoidal signals having a mutual phase difference of 90°.

The first and second magnetic detecting elements A1, B1 and the third and fourth magnetic detecting elements A2, B2 are arranged in angular positions separated by a mechanical angle of 180° along the circumferential direction of the multi-pole magnet 21. The first and third magnetic detecting elements A1, A2 are arranged in the same electrical angular positions and output in-phase sinusoidal signals because the number of poles P of the multi-pole magnet 21 is 28, resulting in an even number of 14 magnetic pole pairs Pp. The second and fourth magnetic detecting elements B1, B2 are also arranged in the same electrical angular positions and output in-phase sinusoidal signals.

The signal processing circuit 15 is provided with a signal combining circuit 16 wired in the manner shown in FIG. 4(b). A sum signal A+ of the output signal of the first magnetic detecting element A1 and the output signal of the third magnetic detecting element A2, and an inverted signal A− of the sum signal A+ are obtained in the signal combining circuit 16. Also obtained are a sum signal B+ of the output signal of the second magnetic detecting element B1 and the output signal of the fourth magnetic detecting element B2, and an inverted signal B− of the sum signal B+.

The first and second magnetic detecting elements A1, B1 and the third and fourth magnetic detecting elements A2, B2 are arranged in the magnetic encoder 10 of the present example in angular positions separated by the mechanical angle of 180°. The use of such an arrangement makes it possible to suppress a reduction in the detection precision of the magnetic detecting elements A1 to B2 due to fluctuations in the magnetic flux density, which are caused by rotational runout of the multi-pole magnet 21.

Also, combining the in-phase sinusoidal signals makes it possible to remove the error component of the output signals of the magnetic detecting elements A1 to B2 due to magnetic flux from the two-pole magnet 22. Therefore, it is possible to detect the rotational position of the rotating shaft 14 with good precision.

For example, a measurement was made for the case in which the offset value of the first to fourth magnetic detecting elements A1 to B2 fluctuated 10% due to the effect of the magnetic flux from the two-pole magnet 22, whereupon an A-phase output and a B-phase output, which have a phase difference of 90°, as shown in FIG. 5(a), were obtained. The error component produced by the two-pole magnet 22 and included in the signals was calculated and confirmed to be substantially zero, as shown in FIG. 5(b).

(Method of Calculating the Absolute Position θabs)

Next, the configuration and signal processing operation of the signal processing circuit 15 of the present example will be described. The signal processing circuit 15 is provided with a computation circuit 17 for calculating the absolute value θel within 1/Pp rotation of the rotating shaft 14 on the basis of the output signal from the multi-pole magnetic detecting unit 11 via the signal combining circuit 16, a computation circuit 18 for calculating the absolute value θt within one rotation of the rotating shaft 14 on the basis of output signal from the two-pole magnetic detecting unit 12, and a computation circuit 19 for calculating the mechanical absolute position θabs within one rotation of the rotating shaft 14 on the basis of the absolute values θel and θt with reference to a correlation table 19a, as shown in FIG. 3(a).

Specifically, resolution Rt, i.e., an absolute position at of the mechanical angle from 0 to 360°, is calculated in the calculation circuit 18 from the sine-wave signals having a phase difference of 90° output from the pair of the Hall elements Ao, Bo of the two-pole magnetic detecting unit 12. In the computation circuit 17, the resolution Rm, i.e., the absolute position θelr of the electrical angles 0 to 360° (mechanical angles 0 to 360/Pp) is computed from the sinusoidal signals, which have a phase difference of 90° and which are combined from the output of the first to fourth magnetic detecting elements A1 to B2 of the multi-pole magnetic detecting unit 11. In the calculation circuit 19, the mechanical angular absolute position θabs within one rotation of the rotating shaft 14 is calculated according to the following equation using θelp (=360°/Pp) and a pole-pair number Nr, which is calculated as described hereinafter.

$$\theta abs = (Nr \times \theta elp + \theta elr)/Pp \quad (1)$$

In order to accurately calculate the pole-pair number Nr, the precision or angular reproducibility X of the two-pole magnetic detecting unit 12 is set so as to satisfy the following equation.

$$X < 2 \times ((\theta elp/2 - (Pp \times \theta elp/Rt))/Pp \quad (2)$$

The signal waveform of the two-pole side outputted from the Hall element Ao is indicated by a thin line in FIG. 6(a), and the signal waveform of the multi-pole side obtained from the signal combining circuit 16 is indicated by a thick line. FIG. 6(b) shows a portion thereof enlarged in the direction of the horizontal axis (time axis).

Figure 8:
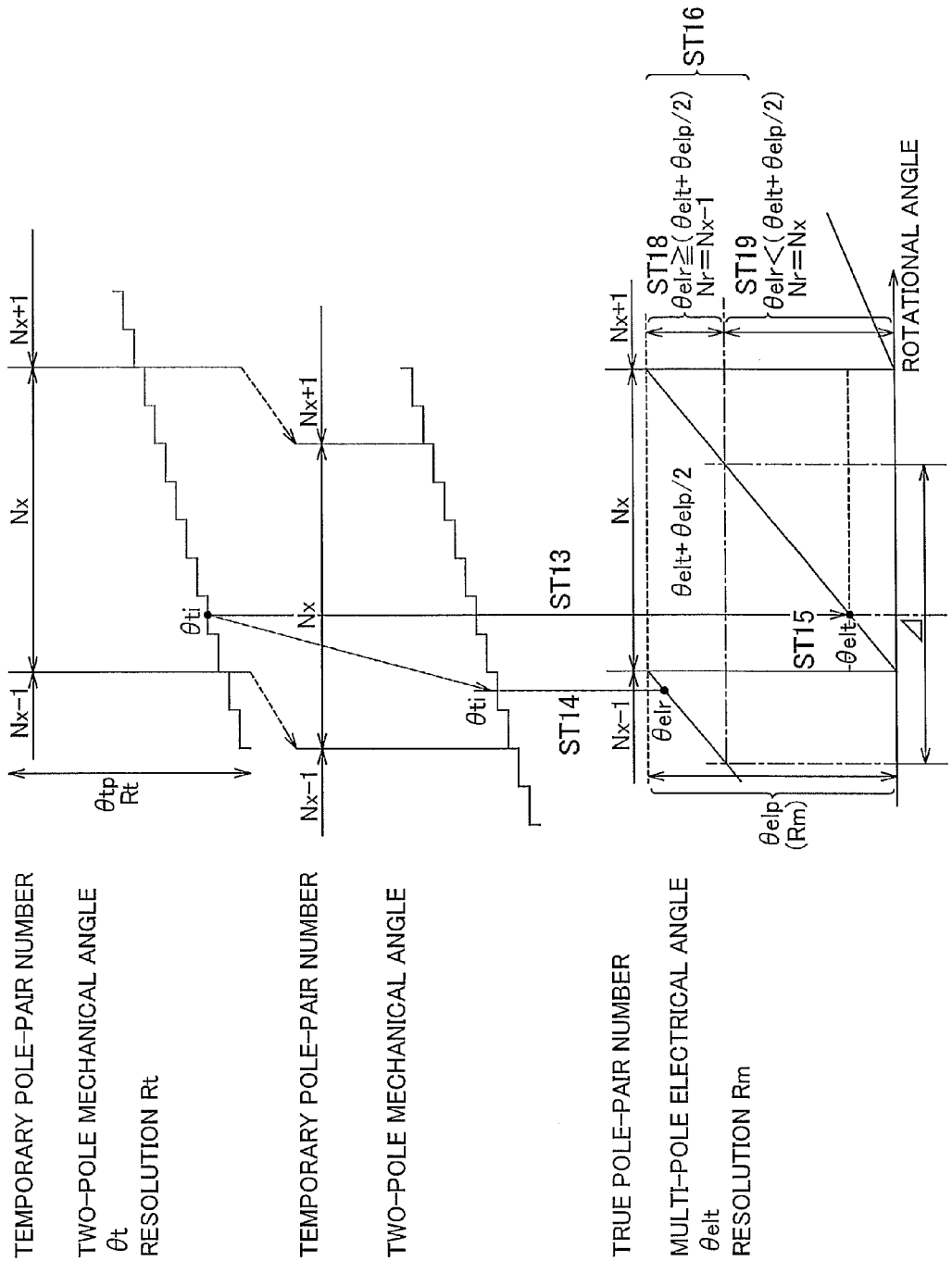
FIG. 8 is a descriptive view showing the processing operation from step ST13 to step ST19 in FIG. 7.
Figure 9:
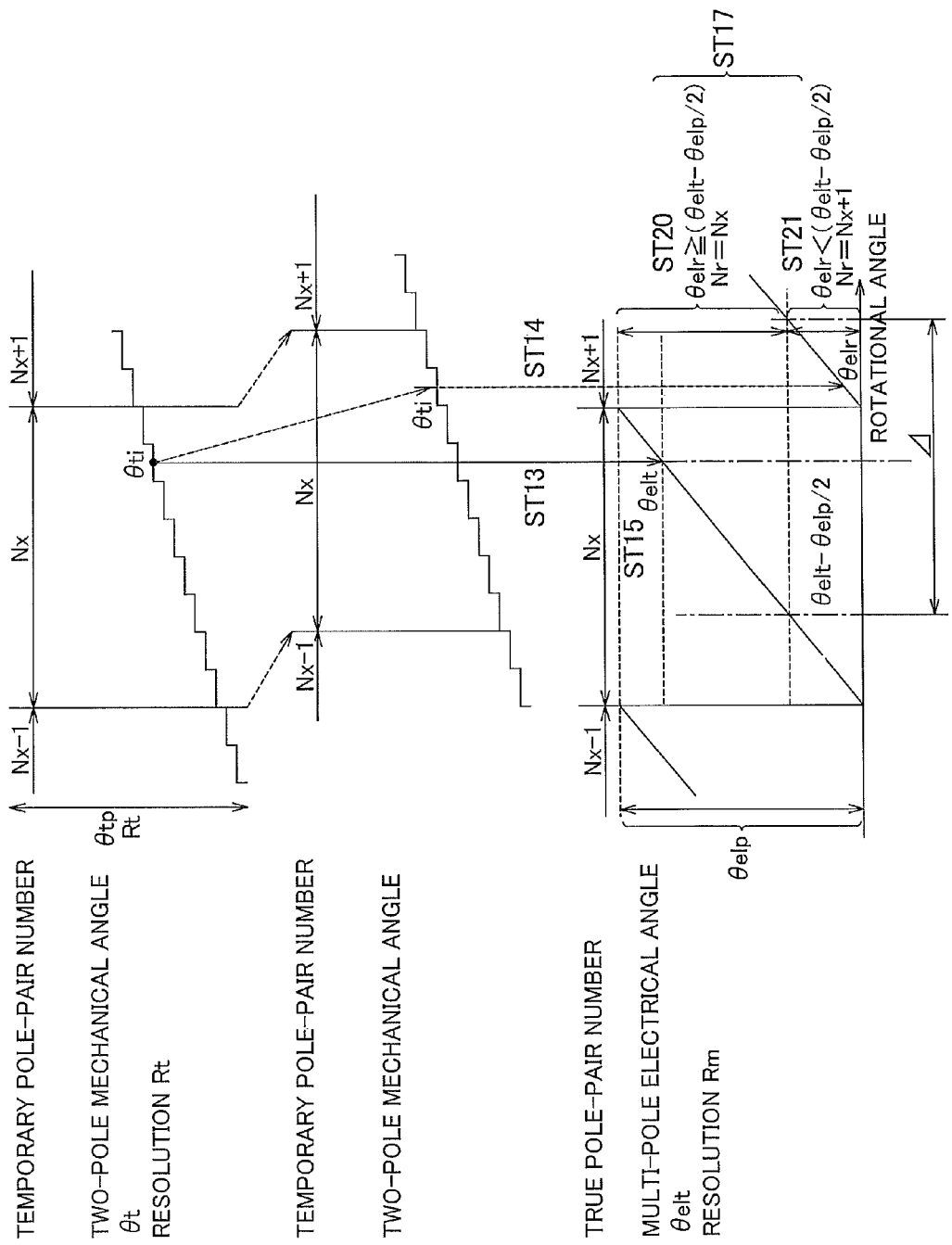
FIG. 9 is a descriptive view showing the processing operation from step ST13 to step ST21 in FIG. 7.

Next, FIG. 7 is a flowchart showing the procedure for calculating the pole-pair number Nr, and FIGS. 8 and 9 are descriptive views showing the operation for calculating the Nr. The symbols have the following meanings.

Rm: Resolution of the multi-pole magnetic detecting unit
Rt: Resolution of the two-pole magnetic detecting unit
θelr: Actual absolute value of the multi-pole magnetic detecting unit (0 to (θelp−1))
θelt: Temporary absolute value of the multi-pole magnetic detecting unit (0 to (θelp−1))
θti: Absolute value of the two-pole magnetic detecting unit (0 to (θtp−1))
Pp: Number of magnetic pole pairs of the multi-pole magnet
Nr: Actual pole-pair number (0 to (Pp−1)) of the multi-pole magnet
Nx: Temporary pole-pair number (0 to (Pp−1)) of the multi-pole magnet Before the actual detection operation in the magnetic encoder 10, the rotating shaft 14 is rotationally driven at a constant temperature, rotational runout, and speed, and the outputs of the two-pole magnetic detecting unit 12 and the multi-pole magnetic detecting unit 11 are measured. In other words, the temporary absolute value θelt of the multi-pole magnetic detecting unit 11 is measured relative to the absolute value θti of the two-pole magnetic detecting unit 12. A temporary pole-pair number Nx of the multi-pole magnet 21 is then assigned to each of the absolute values θti of the two-pole magnetic detecting unit 12. This information is made into the correspondence table 19a and is stored and maintained in the non-volatile memory or the like (step ST11 in FIG. 7).

The absolute value θti of the rotating shaft 14 according to the two-pole magnetic detecting unit 12 is measured at the outset of the actual detection operation (step ST12 in FIG. 7).

The absolute value θti is used to consult the correspondence table 19a, and the temporary absolute value θelt of the multi-pole magnetic detecting unit 11 and the temporary pole-pair number Nx of the multi-pole magnet 21 assigned to the absolute value θti are read (step ST13 of FIG. 7). The absolute value θelr of the rotating shaft 14 according to the multi-pole magnetic detecting unit 11 is measured simultaneously with or subsequent to this operation (step ST14 of FIG. 7).

The absolute value θti of the two-pole magnetic detecting unit 12 corresponding to the actual absolute value θelr changes depending on temperature, speed, and other operational conditions, and the relationship is not constant. The absolute value θti and the absolute value θelt that are assigned as corresponding in the correspondence table 19a therefore frequently do not correspond in actual rotational states. In other words, the correspondence fluctuates within the range of the angular reproducibility X prescribed by Equation (2).

Accordingly, the temporary pole-pair number Nx is corrected, and the accurate pole-pair number Nr is calculated as follows.

First, a determination is made as to whether the absolute value θelt that has been temporarily assigned is equal to or greater than the value θelp/2 (step ST15 in FIG. 7).

When θelt<θelp/2, a determination is made as to whether the measured absolute value θelr is smaller than (θelt+θelp/2) (step ST16 in FIG. 7). The pole-pair number Nr is set on the basis of the results of this determination, as follows.

The pole-pair number Nr is Nx if θelr<(θelt+θelp/2) (step ST19 in FIG. 7). Conversely, the pole-pair number Nr is Nx−1 if θelr≧(θelt+θelp/2) (step ST18 in FIG. 7).

The procedure for the process from step ST13 to steps ST18, 19 of FIG. 7 is shown in FIG. 8. As shown in the drawings, when the absolute value of the two-pole magnetic detecting unit 12 is θti, the absolute value θelr of the multi-pole magnetic detecting unit 11 fluctuates at a fluctuation amplitude Δ due to the axial runout of the rotating shaft 14 or other rotational conditions. When the deviation in the amount of rotation of the rotating shaft 14 is small, the actual rotational position of the rotating shaft 14 will be within the angular range to which the pole-pair number Nx−1 has been assigned. The actual absolute value θelr is larger than (θelt+θelp/2) in this case, on which basis the actual pole-pair number Nr can accordingly be determined to be Nx−1.

On the other hand, when θelt≧θelp/2, a determination is made as to whether the measured absolute value θelr is less than (θelt−θelp/2) (step ST17 in FIG. 7). The pole-pair number Nr is designated as follows on the basis of the results of this determination.

The pole-pair number Nr is Nx if θelr≧(θelt−θelp/2) (step ST20 in FIG. 7). Conversely, the pole-pair number Nr is Nx+1 if θelr<(θelt−θelp/2) (step ST21 in FIG. 7).

The procedure for the process from step ST13 to steps ST20, 21 of FIG. 7 is shown in FIG. 9. As shown in the drawings, when the absolute value of the two-pole magnetic detecting unit 12 is θti, the absolute value θelr of the multi-pole magnetic detecting unit 11 fluctuates at a fluctuation amplitude Δ due to the axial runout of the rotating shaft 4 or other rotational conditions. When the deviation in the amount of rotation of the rotating shaft 14 is large, the actual rotational position of the rotating shaft 14 will be within the angular range to which the pole-pair number Nx+1 has been assigned. The actual absolute value θelr is smaller than (θelt−θelp/2) in this case, on which basis the actual pole-pair number Nr can accordingly be determined to be Nx+1.

The pole-pair number Nr is thus calculated, and the mechanical absolute angular position θabs of the rotating shaft 14 is calculated on the basis of Equation (1) above. The mechanical absolute angular position θabs of the rotating shaft 14 can be continually detected thereafter based on the changes of the absolute value θelr of the multi-pole magnetic detecting unit 11.

If the magnetic encoder 19 of the present example is used as described above, the resolution and precision of detection are prescribed by the multi-pole magnetic detecting unit 11, and the resolution and precision of detection are not limited by the resolution and precision of the two-pole magnetic detecting unit 12. An adjustment for matching the start points of the detection signals of the two-pole magnetic detecting unit 12 and the multi-pole magnetic detecting unit 11 is also unnecessary.

Next, variability can exist in the resolution levels Rti of the two-pole magnetic detecting unit 12 in correspondence with the magnetic pole pair of the multi-pole magnetic detecting unit 11. The sum of the resolution levels Rti of the two-pole magnetic detecting unit 12 in correspondence with each magnetic pole pair can be Rt. When the minimum value of the resolutions Rti is Rtmin, the precision or angular reproducibility X of the two-pole magnetic detecting unit 12 may be set as in the following equation in order to accurately calculate the pole-pair number Nr.

$$X<2\times((\theta elp/2-(\theta elp/Rt\min))/Pp \tag{2A}$$

In general, if the precision or angular reproducibility X of the two-pole magnetic detecting unit 12 is set so as to satisfy the following equation, where M is an integer equal to or greater than 2, the mechanical angular absolute position θabs can be calculated according to the flow shown in FIG. 10.

$$X<2\times((\theta elp/M-(Pp\times\theta elp/Rt))/Pp \tag{2B}$$

In this case as well, when the minimum value of the size Rti of the resolutions of the two-pole magnetic detecting unit 12 corresponding to each of the magnetic pole pairs of the multi-pole magnetic detecting unit 11 is Rtmin, the precision or angular reproducibility X of the two-pole magnetic detecting unit 12 may be set so as to satisfy the following equation in order to accurately calculate the pole-pair number Nr.

$$X<2\times((\theta elp/M-(\theta elp/Rt\min))/Pp \tag{2C}$$

(Embodiment 3)

Next, in the case that the number Pp of pairs of magnetic poles Pp (=P/2) of the multi-pole magnet is an odd number and the third and fourth magnetic detection elements A2, B2 are arranged in positions separated by an electrical angle of 180° along the circumferential direction of the multi-pole magnet with respect to first and second magnetic detection elements A1, B1, the first and third magnetic detection elements A1, A2 are in positions separated by an electrical angle of 180°, and the outputs of the elements have an opposite phase. Similarly, the second and fourth magnetic detecting elements B1, B2 are also arranged in positions separated by an electrical angle of 180° and output opposite-phase sinusoidal signals. The error component produced by the magnetic flux from the two-pole magnet can be removed even with generation of an A-phase signal and a B-phase signal using the difference in the opposite-phase output signals.

In view of the above, in the multi-pole magnetic detecting unit 11A of a magnetic encoder 20 according to embodiment 3 of the present invention, the third and fourth magnetic detecting elements A2, B2 are arranged in positions offset δ (=360°/P) clockwise or counterclockwise about a position separated by a mechanical angle of about 180° along the circumferential direction of the multi-pole magnet 21A with respect to the first and second magnetic detecting elements A1, B, as shown in FIGS. 11 and 12. The configuration is otherwise the same as the magnetic encoder 10 described above.

In such a configuration, the first and third magnetic detecting elements A1, A2 are arranged in the same angular positions and output in-phase sinusoidal signals. Similarly, the second and fourth magnetic detecting elements are arranged in the same angular positions and output in-phase sinusoidal signals.

A sum signal of the output signal of the first magnetic detecting element A1 and the output signal of the third magnetic detecting element A2, and a sum signal of the output signal of the second magnetic detecting element B1 and the output signal of the fourth magnetic detecting element B2 are obtained in the signal combining circuit 16 of the signal processing circuit 15, and the rotational position of the rotating shaft 14 can be detected with good precision based on these sum signals.

For example, a measurement was made for a case in which the offset value of the first to fourth magnetic detecting elements A1 to B2 fluctuated 10% due to the effect of the magnetic flux from the two-pole magnet 22, whereupon an A-phase output and a B-phase output, which have a phase difference of 90°, as shown in FIG. 13(a), were obtained. The error component produced by the two-pole magnet 22 was calculated and confirmed to be considerably reduced, as shown in FIG. 13(b). The error component was confirmed to be reduced to about ⅛ of the error component produced in the comparative example described below (see FIG. 18).

(Embodiment 4)

Next, when the effect due to the magnetic flux from the two-pole magnet 22 is low, the first and second magnetic detecting elements A1, B1 and the third and fourth magnetic detecting elements A2, B2 may be arranged in positions separated by a mechanical angle of exactly 180° along the circumferential direction of the multi-pole magnet 21A in a case in which the two-pole magnet 22 is arranged away from the multi-pole magnet 21A in the magnetic encoder 20 described above, or in a case in which the magnets 21A, 22 are magnetically shielded from each other, or in other cases.

Figure 14:
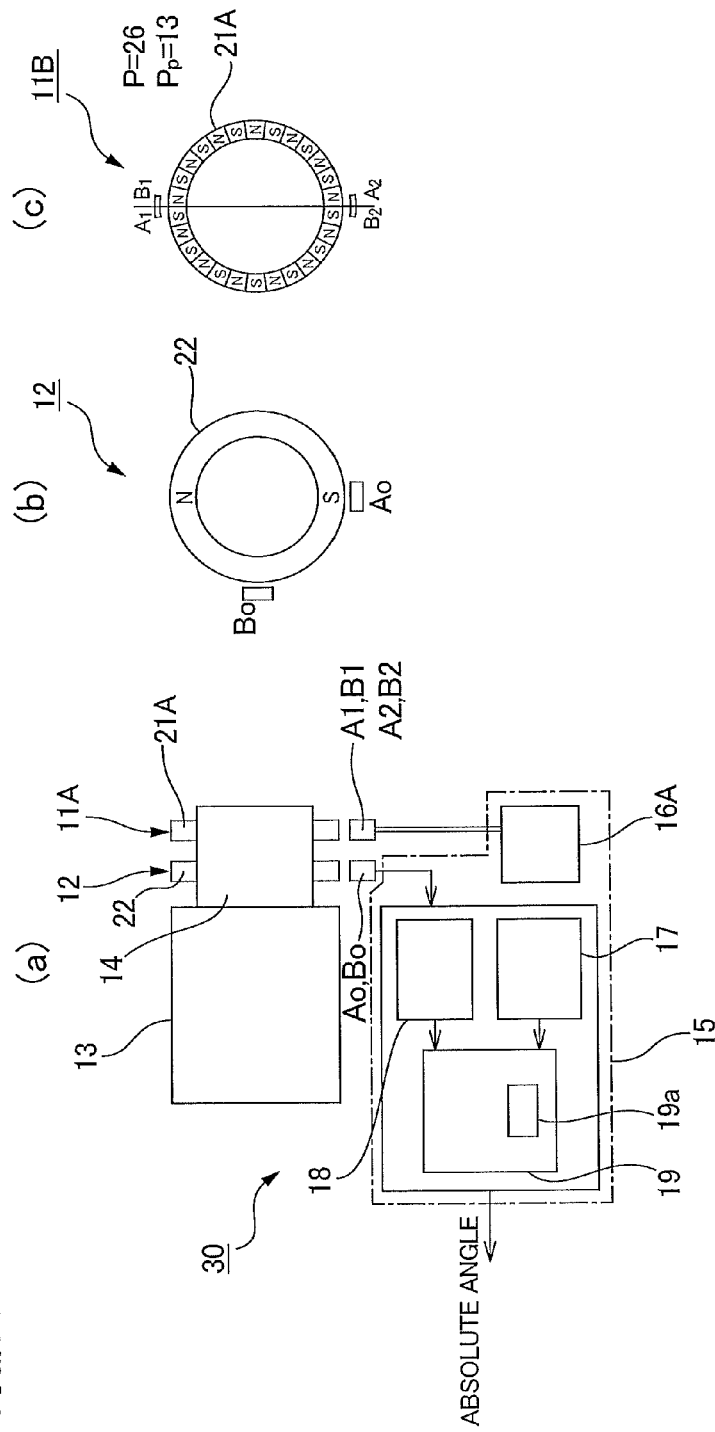
FIG. 14 is a schematic block view showing the magnetic encoder of embodiment 4 of the present invention, a descriptive view showing the two-pole magnetic detecting unit of the magnetic encoder, and the multi-pole magnetic detecting unit of the magnetic encoder.

FIGS. 14 and 15 show the configuration of the magnetic encoder in this case. In the multi-pole magnetic detecting unit 11B in a magnetic encoder 30, the first and third magnetic detecting elements A1, A2 are arranged in angular positions separated by an electrical angle of 180° and output opposite-phase sinusoidal signals. Similarly, the second and fourth magnetic detecting elements B1, B2 are also arranged in angular positions separated by an electrical angle of 180° and output opposite-phase sinusoidal signals.

As shown in FIG. 15(b), the first and third magnetic detecting elements A1, A2 are connected in parallel in opposite phase, and a differential signal A+ of these output signals and an inverted signal A− of the differential signal A+ are obtained in the signal combining circuit 16A of the signal processing circuit 15. Similarly, a differential signal B+ of the output signal of the second magnetic detecting element B1 and the output signal of the fourth magnetic detecting element B2, and an inverted signal B− of the differential signal B+ are obtained. An error component caused by rotational runout of the rotating shaft can be removed based on a combined signal of these signals.

The configuration is otherwise the same as the above-described magnetic encoder 10 or the magnetic encoder 20.

COMPARATIVE EXAMPLE

Figure 16:
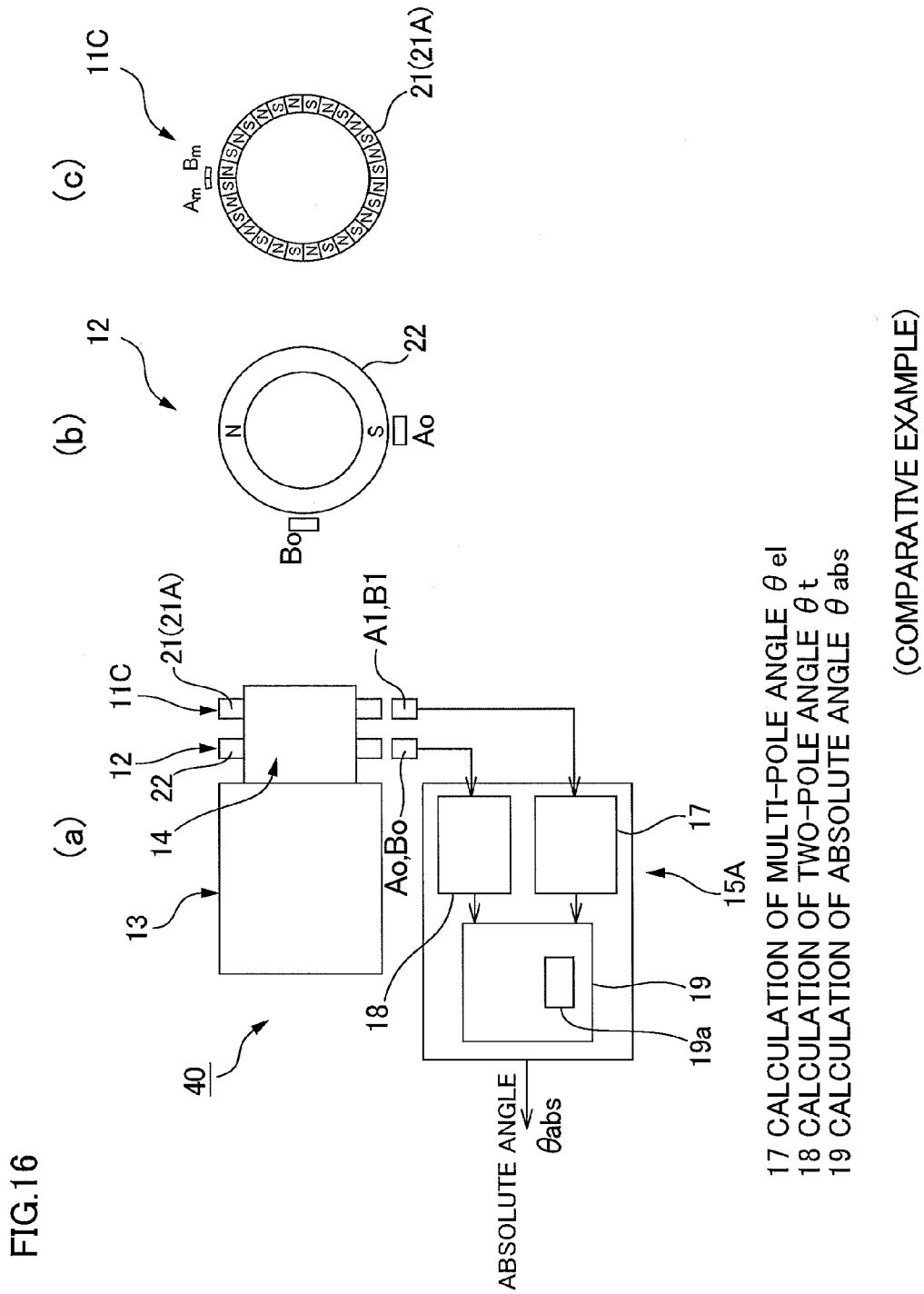
FIG. 16 is a schematic block view showing the magnetic encoder of a comparative example, a descriptive view showing the two-pole magnetic detecting unit of the magnetic encoder, and the multi-pole magnetic detecting unit of the magnetic encoder.

FIG. 16 is a schematic block view showing a magnetic encoder as a comparative example, a descriptive view of the two-pole magnetic detecting unit, and a descriptive view of the multi-pole magnetic detecting unit. The comparative example is used for comparing the above-described magnetic encoder 10 of embodiment 2 and the magnetic encoder 30 of embodiment 3.

In the magnetic encoder 40 of the comparative example, the multi-pole magnetic detecting unit 11C is provided solely with a pair of the adjacently arranged first and second magnetic detecting elements A1, B1, and an absolute value θelr is computed based on these output signals in the signal processing circuit 15A.

A multi-pole magnet 21 having a pole number P of 28 was used as the multi-pole magnet of the magnetic encoder 40 of the comparative example, as shown in FIG. 17(a). In this case, a measurement was made for the case in which the offset value of the magnetic detecting elements A1, B1 fluctuated 10% due to the effect of the magnetic flux from the two-pole magnet 22, whereupon an A-phase output and a B-phase output, which have a phase difference of 90°, as shown in FIG. 17(a), were obtained. The error component produced by the two-pole magnet 22 was calculated and was found to be considerable, as shown in FIG. 17(c).

A multi-pole magnet 21A having a pole number P of 26 was used as the multi-pole magnet of the magnetic encoder 40 of the comparative example, as shown in FIG. 18(a). In this case, a measurement was made for the case in which the offset value of the magnetic detecting elements A1, B1 fluctuated 10% due to the effect of the magnetic flux from the two-pole magnet 22, whereupon an A-phase output and a B-phase output, which have a phase difference of 90°, as shown in FIG. 18(b), were obtained. The error component produced by the two-pole magnet 22 was calculated and was found to be considerable, as shown in FIG. 18(c).

In accordance with the magnetic encoder of the present invention, a considerable amount of error caused by magnetic flux from the two-pole magnet can be removed. This is apparent when a comparison is made between the error components in the comparative examples and FIGS. 5(b) and 13(b), which show the error components in embodiments 2 and 3.

The invention claimed is:

1. A magnetic encoder comprising:
    a multi-pole magnet in which N-poles and S-poles are formed in alternating fashion at equiangular intervals along a circumferential direction;
    first and second magnetic detecting elements adjacently arranged so as to output a sinusoidal signal having a mutual phase difference of 90° in accompaniment with the rotation of the multi-pole magnet;
    third and fourth magnetic detecting elements adjacently arranged so as to output a sinusoidal signal having a mutual phase difference of 90° in accompaniment with the rotation of the multi-pole magnet; and
    a signal processing circuit whereby a signal that represents the rotational position of a rotational shaft to which the multi-pole magnet is coaxially secured is generated on the basis of a sum signal or a differential signal of the output signal of the first magnetic detecting element and the output signal of the third magnetic detecting element, and on the basis of a sum signal or a differential signal of the output signal of the second magnetic detecting element and the output signal of the fourth magnetic detecting element, wherein
    the number of magnetic poles P of the multi-pole magnet is an even number of 4 or higher;
    the third and fourth magnetic detecting elements are arranged at angular positions separated by a mechanical angle of about 180° along a circumferential direction of the multi-pole magnet with respect to the first and second magnetic detecting elements;

the first and third magnetic detecting elements are arranged in the same angular positions or separated by an electrical angle of 180°; and the second and fourth magnetic detecting elements are arranged in the same angular positions or separated by an electrical angle of 180°.

2. The magnetic encoder according to claim 1, wherein the number Pp (=P/2) of pairs of magnetic poles of the multi-pole magnet is an even number;

the third and fourth magnetic detecting elements are arranged in positions separated by a mechanical angle of about 180° along the circumferential direction of the multi-pole magnet with respect to the first and second magnetic detecting elements; and the signal processing circuit generates a signal that represents the rotational position of the rotational shaft, the signal being generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

3. The magnetic encoder according to claim 1, wherein the number Pp (=P/2) of pairs of magnetic poles of the multi-pole magnet is an odd number;

the third and fourth magnetic detecting elements are arranged in positions offset 360°/P clockwise or counterclockwise about a position separated by a mechanical angle of about 180° along the circumferential direction of the multi-pole magnet with respect to the first and second magnetic detecting elements; and the signal processing circuit generates a signal that represents the rotational position of the rotational shaft, the signal being generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

4. The magnetic encoder according to claim 1, wherein the number Pp (=P/2) of pairs of magnetic poles of the multi-pole magnet is an odd number;

the third and fourth magnetic detecting elements are arranged in positions separated by a mechanical angle of about 180° along the circumferential direction of the multi-pole magnet with respect to the first and second magnetic detecting elements; and the signal processing circuit generates a signal that represents the rotational position of the rotational shaft, the signal being generated on the basis of a differential signal of the output signal of the first magnetic detecting element and the output signal of the third magnetic detecting element, and on the basis a differential signal of the output signal of the second magnetic detecting element and the output signal of the fourth magnetic detecting element.

5. A magnetic encoder comprising:

a multi-pole magnetic detecting unit provided with multi-pole magnet having N-poles and S-poles formed in alternating fashion at equiangular intervals along a circumferential direction, first and second magnetic detecting elements adjacently arranged so as to output a sinusoidal signal having a mutual phase difference of 90° in accompaniment with the rotation of the multi-pole magnet, and third and fourth magnetic detecting elements adjacently arranged so as to output a sinusoidal signal having a mutual phase difference of 90° in accompaniment with the rotation of the multi-pole magnet;

a two-pole magnetic detecting unit provided with a two-pole magnet bipolarly magnetized at equiangular intervals along the circumferential direction, and a pair of magnetic detecting elements for outputting a sinusoidal signal having a mutual phase difference of 90° in accompaniment with the rotation of the two-pole magnet; and a signal processing circuit whereby a signal that represents a mechanical angular absolute position $\theta abs$ within one rotation of a rotational shaft to which the two-pole magnet and the multi-pole magnet are coaxially secured is generated on the basis of the output signals of the first through fourth magnetic detecting elements and the output signals of the pair of magnetic detecting elements, wherein the number of poles P of the multi-pole magnet is an even number of four or more;

the third and fourth magnetic detecting elements are arranged in positions separated by a mechanical angle of about 180° along a circumferential direction of the multi-pole magnet with respect to the first and second magnetic detecting elements;

the first and third magnetic detecting elements are arranged in the same electrical angular positions or in electrical angular positions separated by 180°; and the second and fourth magnetic detecting elements are arranged in the same electrical angular positions or in electrical angular positions separated by 180°.

6. The magnetic encoder according to claim 5, wherein:

the number Pp (=P/2) of pairs of magnetic poles of the multi-pole magnet is an even number;

the third and fourth magnetic detecting elements are arranged in positions separated by a mechanical angle of about 180° along the circumferential direction of the multi-pole magnet with respect to the first and second magnetic detecting elements; and the signal processing circuit generates a signal that represents an absolute position $\theta elr$ within 1/M rotation of the rotational shaft, the signal being generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

7. A method of detecting absolute rotational position for detecting a mechanical angle absolute position $\theta abs$ within one rotation of a rotating shaft using the magnetic encoder according to claim 6, the method wherein:

in advance of an operation for detecting the rotational position of the rotating shaft, the rotating shaft is caused to rotate, an absolute value $\theta elt$ obtained from the multi-pole magnetic detecting unit is measured and assigned to the absolute values $\theta t$ obtained from the two-pole magnetic detecting unit, and a temporary pole-pair number Nx of the multi-pole magnet is assigned to the absolute values $\theta t$ obtained from the two-pole magnetic detecting unit;

wherein, when detection of the rotational position of the rotating shaft is started, the absolute value $\theta ti$ of the rotating shaft according to the two-pole magnetic detecting unit is measured;

the absolute value $\theta elr$ of the rotating shaft according to the multi-pole magnetic detecting unit is measured;

the temporary pole-pair number Nx assigned to the absolute value θti is corrected and the pole-pair number Nr is calculated on the basis of the absolute value θelt assigned to the measured absolute value θti and on the basis of the measured absolute value θelr; and a mechanical angle absolute position θabs within one rotation of the rotating shaft is calculated according to the following formula using a mechanical angle θelp (=360°/Pp) that corresponds to an electrical angle of one period of an output signal of the multi-pole magnetic detecting unit.

θabs=(Nr×θelp+θelr)/Pp

8. A method of detecting absolute rotational position, comprising, in the magnetic encoder according to claim 7, setting an angular reproducibility X of the two-pole magnetic detecting unit so as to satisfy the equation X<2×{((θelp/M)−(Pp×θelp/Rt))/Pp}, where Rt is the resolution of the two-pole magnetic detecting unit, and M is an integer of 2 or greater;

wherein, when θelt≧θelp/M, the pole-pair number Nr is set to Nx if θelr≧(θelt−θelp/M), and the pole-pair number Nr is set to Nx+1 if θelr<(θelt−θelp/M); and wherein, when θelt<θelp/2, the pole-pair number Nr is set to Nx if θelr<(θelt+θelp/M), and the pole-pair number Nr is set to Nx−1 if θelr≧(θelt+θelp/M).

9. The method of detecting absolute rotational position according to claim 8, comprising setting the angular reproducibility X of the two-pole magnetic detecting unit so as to satisfy the equation X<2×{((θelp/M)−(Pp×θelp/Rt))/Pp}, where Rt is the resolution of the two-pole magnetic detecting unit.

10. The method of detecting absolute rotational position according to claim 8, comprising setting the angular reproducibility X of the two-pole magnetic detecting unit so as to satisfy the equation X<2×{((θelp/2)−(θelp/Rtmin))/Pp)}, where Rtmin is the minimum value of the resolution of the two-pole magnetic detecting unit for each of the magnetic pole pairs of the multi-pole magnetic detecting unit.

11. The magnetic encoder according to claim 5, wherein:

the number Pp (=P/2) of pairs of magnetic poles of the multi-pole magnet is an odd number;

the third and fourth magnetic detecting elements are arranged in positions offset 360°/P clockwise or counterclockwise about a position separated by a mechanical angle of about 180° along the circumferential direction of the multi-pole magnet with respect to the first and second magnetic detecting elements; and the signal processing circuit generates a signal that represents an absolute position θelr within 1/Pp rotation of the rotational shaft, the signal being generated on the basis of a sum signal of the output signal of the first magnetic detecting element and the output signal of the third magnetic detecting element, and on the basis of a sum signal of the output signal of the second magnetic detecting element and the output signal of the fourth magnetic detecting element.

12. A method of detecting absolute rotational position for detecting a mechanical angle absolute rotational position θabs within one rotation of the rotating shaft using the magnetic encoder according to claim 11, wherein:

in advance of an operation for detecting the rotational position of the rotating shaft, the rotating shaft is caused to rotate, an absolute value θelt obtained from the multi-pole magnetic detecting unit is measured and assigned to an absolute values θt obtained from the two-pole magnetic detecting unit, and a temporary pole-pair number Nx of the multi-pole magnet is assigned to the absolute values θt obtained from the two-pole magnetic detecting unit;

wherein, when detection of the rotational position of the rotating shaft is started, the absolute value θti of the rotating shaft according to the two-pole magnetic detecting unit is measured;

the absolute value θelr of the rotating shaft according to the multi-pole magnetic detecting unit is measured;

the temporary pole-pair number Nx assigned to the absolute value θti is corrected and the pole-pair number Nr is calculated on the basis of the absolute value θelt assigned to the measured absolute value θti and on the basis of the measured absolute value θelr; and a mechanical angle absolute position θabs within one rotation of the rotating shaft is calculated according to the following formula using a mechanical angle θe1p (=360°/Pp) that corresponds to an electrical angle of one period of an output signal of the multi-pole magnetic detecting unit.

θabs=(Nr×θe1p+θelr)/Pp

13. A method of detecting absolute rotational position, wherein, in the magnetic encoder according to claim 12, setting the angular reproducibility X of the two-pole magnetic detecting unit so as to satisfy X<2×{((θelp/M)−(Pp×θelp/Rt))/Pp}, where Rt is the resolution of the two-pole magnetic detecting unit, and M is an integer of 2 or greater;

wherein, when θelt≧θelp/M, the pole-pair number Nr is set to Nx if θelr≧(θelt−θelp/M), and the pole-pair number Nr is set to Nx+1 if θelr<(θeft−θelp/M); and wherein, when θelt<θelp/2, the pole-pair number Nr is set to Nx if θelr<(θelt+θelp/M), and the pole-pair number Nr is set to Nx−1 if θelr (θelt+θelp/M).

14. The method of detecting absolute rotational position according to claim 12, setting angular reproducibility X of the two-pole magnetic detecting unit so as to satisfy X<2×{((θelp/M)−(Pp x θelp/Rt))/Pp}, where Rt is the resolution of the two-pole magnetic detecting unit, and M is an integer of 2 or greater.

15. The method of detecting absolute rotational position according to claim 12, setting angular reproducibility X of the two-pole magnetic detecting unit so as to satisfy X<2×{((θelp/2)−(θelp/Rtmin))/Pp}, where Rtmin is the minimum value of the resolution of the two-pole magnetic detecting unit for each of the magnetic pole pairs of the multi-pole magnetic detecting unit.

16. The magnetic encoder according to claim 5, wherein:

the number Pp (=P/2) of pairs of magnetic poles of the multi-pole magnet is an odd number;

the first and second magnetic detecting elements, and the third and fourth magnetic detecting elements are arranged in positions separated by a mechanical angle of 180° along the circumferential direction of the multi-pole magnet; and the signal processing circuit generates a signal that represents an absolute position θelr within 1/Pp rotation of the rotational shaft, the signal being generated on the basis of a differential signal of the output signal of the first magnetic detecting element and the output signal of the third magnetic detecting element, and on the basis a differential signal of the output signal of the second magnetic detecting element and the output signal of the fourth magnetic detecting element.

\* \* \* \* \*